US011803989B2

(12) United States Patent
Ramasubramonian et al.

(10) Patent No.: US 11,803,989 B2
(45) Date of Patent: Oct. 31, 2023

(54) QUANTIZATION FOR GEOMETRY-BASED POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/143,696

(22) Filed: Jan. 7, 2021

(65) Prior Publication Data

US 2021/0209811 A1      Jul. 8, 2021

Related U.S. Application Data

(60) Provisional application No. 62/958,423, filed on Jan. 8, 2020.

(51) Int. Cl.
*G06T 9/40* (2006.01)
*G06T 7/73* (2017.01)

(52) U.S. Cl.
CPC ............... *G06T 9/40* (2013.01); *G06T 7/73* (2017.01); *G06T 2207/10028* (2013.01)

(58) Field of Classification Search
None
See application file for complete search history.

(56) References Cited

U.S. PATENT DOCUMENTS

2021/0407142 A1* 12/2021 Hur ........................... G06T 9/40
2022/0070462 A1*  3/2022 Ikonin .................. H04N 19/132

OTHER PUBLICATIONS

3DG: "G-PCC Codec Description v5", Coding of Moving Pictures and Audio, ISO/IEC JTC1/SC29/WG11, N18891, Oct. 2019, Geneva, CH, Dec. 13, 2019, 75 pages.
"Information Technology—MPEG-I (Coded Representation of Immersive Media)—Part 9: Geometry-based Point Cloud Compression", CD Stage, ISO/IEC 23090-9:2019(E), ISO/IEC JTC 1/SC 29/WG 11, 2019, 129 pages.
"Information Technology—MPEG-I (Coded Representation of Immersive Media)—Part 9: Geometry-based Point Cloud Compression", DIS Stage, ISO/IEC 23090-9:2020(E), ISO/IEC JTC 1/SC 29/WG 11, 2020, 152 pages.
International Search Report and Written Opinion—PCT/US2021/012645—ISA/EPO—dated Apr. 1, 2021 15 Pages.

(Continued)

*Primary Examiner* — Tapas Mazumder
(74) *Attorney, Agent, or Firm* — QUALCOMM Incorporated; Espartaco Diaz Hidalgo

(57) ABSTRACT

A method of decoding a point cloud comprises: reconstructing a position of a point of the point cloud; determining a quantized attribute value for the point; deriving a quantization parameter (QP) bit depth offset for the point; deriving a QP range for the point based on the QP bit depth offset for the point; determining a quantization step size for the point based on the QP range for the point; and inverse quantizing the quantized attribute value for the point based on the quantization step size for the point.

17 Claims, 7 Drawing Sheets

(56) References Cited

OTHER PUBLICATIONS

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ramasubramonian (Qualcomm) A.K., et al.,"[G-PCC] On Quantization Parameters in G-PCC", 129. MPEG Meeting, Jan. 13, 2020-Jan. 17, 2020, Brussels, (Motion Picture Expert Group or ISO/IEC JTC1/SC29/WG11), No. m52501, Jan. 16, 2020 (Jan. 16, 2020), XP030225166, 9 Pages, Retrieved from the Internet: URL:http://phenix.int-evry.fr/mpeg/doc_end_user/documents/129_Brussels/wg11/m52501-v3-m52501-v3.zip m52501-v3.docx [retrieved on Jan. 16, 2020].

Rapaka K., et al., "Qp derivation for Adaptive Color Transform", 19. JCT-VC Meeting, Oct. 17, 2014-Oct. 24, 2014, Strasbourg, (Joint Collaborative Team on video Coding of ISO/IEC JTC1/SC29/WG11 and ITU-T SG.16 ), URL: http://wftp3.itu.int/av-arch/jctvc-site/, No. JCTVC-S0144, Oct. 8, 2014 (Oct. 8, 2014), XP030116913, pp. 1-4.

Ray B., et al., "[G-PCC][new] Attribute Related High Level Syntax—Fixes and Improvements", Coding of Moving Pictures and Audio, ISO/IEC JTC1/SC29/WG11, MPEG2020/M53652, Alpbach, AT, Apr. 2020, 17 pages.

"Text of ISO/IEC CD 23090-9 Geometry-Based Point Cloud Compression", 126. MPEG Meeting, Mar. 25, 2019-Mar. 29, 2019, Geneva, (Motion Picture Expert Group or ISO/IEC JTC1/SC29/WG11), No. n18478, Jul. 2, 2019 (Jul. 2, 2019), XP030222353, 102 Pages, Retrieved from the Internet: URL:http://phenix.int-evry.fr/mpeg/ioc_end_user/documents/126_Geneva/wg11/w18478.zip w18478 GPCC_CD.docx [retrieved on Jul. 2, 2019].

\* cited by examiner

# QUANTIZATION FOR GEOMETRY-BASED POINT CLOUD COMPRESSION This application claims the benefit of U.S. Provisional Patent Application 62/958,423, filing date Jan. 8, 2020, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for point cloud encoding and decoding, including techniques related to geometry-based point cloud compression (G-PCC). More specifically, this disclosure describes techniques that may improve processes for quantizing and inverse quantizing attribute values of points in point clouds. The techniques of this disclosure may reduce consumption of computational resources, may provide increased compression, or may provide other benefits.

In one example, this disclosure describes a method of decoding a point cloud, the method comprising: reconstructing a position of a point of the point cloud; determining a quantized attribute value for the point; deriving a quantization parameter (QP) bit depth offset for the point; deriving a QP range for the point based on the QP bit depth offset for the point; determining a quantization step size for the point based on the QP range for the point; and inverse quantizing the quantized attribute value for the point based on the quantization step size for the point.

In another example, this disclosure describes a device for decoding a point cloud, the device comprising: a memory configured to store data representing the point cloud; and one or more processors implemented in circuitry, the one or more processors configured to: reconstruct a position of a point of the point cloud; determine a quantized attribute value for the point; derive a quantization parameter (QP) bit depth offset for the point; derive a QP range for the point based on the QP bit depth offset for the point; determine a quantization step size for the point based on the QP range for the point; and inverse quantize the quantized attribute value for the point based on the quantization step size for the point.

In another example, this disclosure describes a device for decoding a point cloud, the device comprising: means for reconstructing a position of a point of the point cloud; means for determining a quantized attribute value for the point; means for deriving a quantization parameter (QP) bit depth offset for the point; means for deriving a QP range for the point based on the QP bit depth offset for the point; means for determining a quantization step size for the point based on the QP range for the point; and means for inverse quantizing the quantized attribute value for the point based on the quantization step size for the point.

In another example, this disclosure describes a computer-readable storage medium having stored thereon instructions that, when executed, cause one or more processors to: reconstruct a position of a point of a point cloud; determine a quantized attribute value for the point; derive a quantization parameter (QP) bit depth offset for the point; derive a QP range for the point based on the QP bit depth offset for the point; determine a quantization step size for the point based on the QP range for the point; and inverse quantize the quantized attribute value for the point based on the quantization step size for the point.

The details of one or more examples are set forth in the accompanying drawings and the description below. Other features, objects, and advantages will be apparent from the description, drawings, and claims.

DETAILED DESCRIPTION

Figure 1:
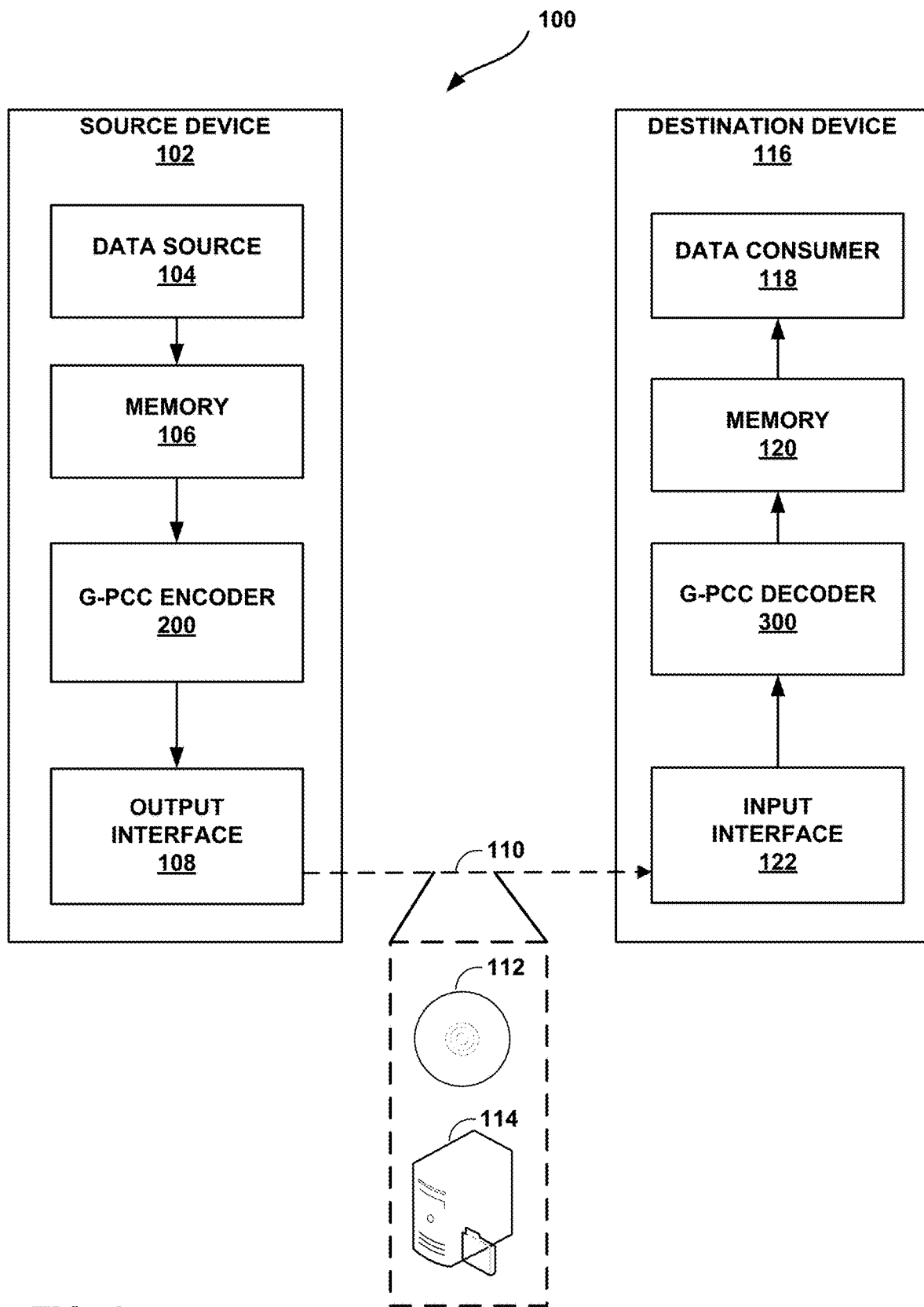
FIG. 1 is a block diagram illustrating an example encoding and decoding system that may perform the techniques of this disclosure.

Geometry-based point cloud compression (G-PCC) includes techniques for point cloud compression. In G-PCC, each point of a point cloud may be associated with a set of attributes. The attributes of a point may provide color information about the point; attributes of a point may also include other characteristics such as reflectance, surface normal, etc. G-PCC allows the coding of different types of attributes. For instance, the attributes of a point may include a luma attribute value and two chroma attribute values. In G-PCC, the attributes of a point may be signaled along with information about the 3-dimensional position of the point. Furthermore, in G-PCC, high-level information about attributes may be signaled in an attribute parameter set (APS). The attributes of points may be signaled in "attribute slices." General information about one or more attribute slices may be signaled in an attribute slice header. One or more attribute slice headers may refer to an APS.

Because signaling the attributes of points in a point cloud may otherwise entail the transmission of significant amounts of data, some example G-PCC techniques specify processes for reducing the amount of data involved in signaling the attributes of the points. For instance, a G-PCC encoder may apply one or more transforms to the attributes to generate coefficients representing the attributes. This disclosure may refer to coefficients representing attributes as attribute values or attribute coefficients. Additionally, the G-PCC encoder may quantize the attribute values to reduce the bit depth of the attribute values. The G-PCC encoder may apply arithmetic encoding to the quantized attribute values to further reduce the amount of data used to signal the quantized attribute values. A G-PCC decoder may apply inverse quantization to restore the original bit depths of attribute values.

The quantization process used by G-PCC encoders and the inverse quantization process used by G-PCC decoders operate according to quantization parameters (QPs) that control amounts of quantization and inverse quantization to apply to attribute values. Because the human eye is more sensitive to changes in luminance than to changes in chrominance, different QPs may be used for luma attribute values and chroma attribute values. A G-PCC decoder may need to determine the QP that a G-PCC encoder used when quantizing an attribute value when inverse quantizing the attribute value. Accordingly, the G-PCC encoder may need to signal the QP to the G-PCC decoder in some way. Because signaling QPs may add to the amount of data that needs to be signaled, the G-PCC encoder may use a tiered approach for signaling QPs. For instance, the G-PCC encoder may signal an initial attribute QP in an APS, e.g., in an aps_attr_initial_qp syntax element. The G-PCC encoder may also signal an offset chroma attribute QP in the APS, e.g., in an aps_attr_chroma_qp offset syntax element. The offset chroma attribute QP indicates an offset of an initial chroma attribute QP from the initial attribute QP.

Additionally, a delta luma QP value and a delta chroma QP value may be signaled in an attribute slice header (ASH) for a slice. The delta luma QP value signaled in the ASH (i.e., an ASH delta luma QP value) may indicate a difference between a luma QP for a slice and the initial attribute QP signaled in an applicable APS. The delta chroma QP value signaled in the ASH (i.e., an ASH delta chroma QP value) may indicate a difference between a chroma QP for the slice and the initial chroma attribute QP. For further refinement of QPs, the ASH may include delta QP values for one or more layers; when attributes are coded using levels of detail, or using multiple hierarchical layers of the RAHT transform, the delta QP values may be specified to apply different quantization values for points belonging to different layers. For instance, the ASH may include an ASH layer delta luma QP value (e.g., an ash_attr_layer_qp_delta_luma syntax element) that indicates a difference between the luma QP for the slice and a luma QP for a layer. The ASH may also include an ASH layer delta chroma QP value (e.g., an ash_attr_layer_qp_delta_chroma syntax element) that indicates a difference between the chroma QP for the slice and a chroma QP for the layer.

Furthermore, the points associated with a layer of a slice may be divided into two or more regions. Some regions may be of greater importance than other regions. Thus, some regions may be referred to as regions-of-interest. Attribute values of points that are not within a region-of-interest (ROI) may be quantized more than attribute values of points that are within an ROI. Accordingly, a G-PCC encoder may signal, in an ASH, delta QP values for regions. The delta QP value for a region may indicate a difference between a luma QP for a layer and the luma QP for the region, and may also indicate a difference between a chroma QP for the layer and the chroma QP for the region.

Thus, in the process described above, a G-PCC decoder may be configured to add together a number of different values in order to determine a luma QP for a point in a point cloud and a chroma QP for the point. This may result in a situation in which the luma QP for the point or the chroma QP for the point is outside a valid range of QPs. Attempting to quantize or dequantize attribute values using a QP that is outside the valid range of QPs may cause decoding errors, which may reduce the quality of the decoded point cloud or cause the G-PCC decoder to crash.

Accordingly, an example G-PCC standard currently being developed by ISO/IEC MPEG imposes a constraint specifies that any bitstream that produces QPs that are outside the valid range of QPs is not a conforming bitstream. Thus, to comply with this constraint, a G-PCC encoder may be configured to check that the QPs are within the valid range during a bitstream conformance test. Checking that the QPs are within the valid range may slow the process of performing the bitstream conformance test and may consume valuable computing resources, such as power and computing cycles, which may be in limited supply, especially in mobile devices. Furthermore, fixing the valid range of QPs to 4 to 51 may be sufficient for 8-bit attribute coefficients, but may not be appropriate for attribute coefficients having greater bit depths. Additionally, in the G-PCC standard, only a single delta QP value for a region is signaled. The delta QP value for the region is applied for both luma attribute values and chroma attribute values. However, using the same delta QP value for a region may not be sufficient to produce desired levels of compression and/or quality.

This disclosure describes techniques that may address one or more of these issues. For instance, in one example, a G-PCC decoder may reconstruct a position of a point of the point cloud and may inverse quantize attribute data for the point. The attribute data for the point may include a luma value (i.e., a luma attribute value) and a chroma value (i.e., a chroma attribute value). As part of inverse quantizing the attribute data, the G-PCC decoder may clip a luma QP and may clip a chroma QP. Furthermore, as part of inverse quantizing the attribute data, the G-PCC decoder may inverse quantize the luma value based on the clipped luma QP and may inverse quantize the chroma value based on the clipped chroma QP. By clipping the luma QP and clipping the chroma QP at the G-PCC decoder, it may be unnecessary to determine during a bitstream conformance test whether the luma QP and the chroma QP are within the valid range. This may accelerate the bitstream conformance testing process and may conserve computing resources.

In some examples, the G-PCC decoder may reconstruct a position of a point of the point cloud and may determine a quantized attribute value for the point. In this disclosure, the term attribute value may refer to an attribute coefficient. The G-PCC decoder may also derive a QP bit depth offset for the point. Additionally, the G-PCC decoder may derive a QP range for the point based on the QP bit depth offset for the point. The G-PCC decoder may determine a quantization step size for the point based on the QP range for the point. In general, a quantization step size may indicate how many non-quantized values are quantized into a single quantized value. Furthermore, the G-PCC decoder may inverse quantize the quantized attribute value for the point based on the quantization step size for the point. The use of the QP bit depth offset may allow for coding of attribute coefficients with bit depths greater than 8 bits. This may enable more precision and accuracy in decoded attribute values.

In some examples, a G-PCC encoder may quantize a luma attribute value for a point in the point cloud based on a luma QP for the point and may quantize a chroma attribute value for the point based on a chroma QP for the point. The point may be in a region. The G-PCC encoder may signal, in a bitstream, data representing the quantized luma attribute value for the point and the quantized chroma attribute value for the point. Additionally, the G-PCC encoder may signal, in the bitstream, an attribute region luma QP delta syntax element that specifies a delta QP from a slice luma QP of the region. Based on the point being in the region, the luma QP for the point may be equal to a value specified by the attribute region luma QP delta syntax element plus the slice luma QP of the region. The G-PCC encoder may signal, in the bitstream, an attribute region chroma QP delta syntax element that specifies a delta QP from a slice chroma QP of the region. Based on the point being in the region, the chroma QP for the point may be equal to a value specified by the attribute region chroma QP delta syntax element plus the slice chroma QP of the region.

Similarly, a G-PCC decoder may obtain, from a bitstream, an attribute region luma QP delta syntax element that specifies a delta QP from a slice luma QP of a region. The G-PCC decoder may obtain, from the bitstream, an attribute region chroma QP delta syntax element that specifies a delta QP from a slice chroma QP of the region. The G-PCC decoder may determine a luma QP for a point of the point cloud based on the attribute region luma QP delta syntax element. Additionally, the G-PCC decoder may determine a chroma QP for the point based on the attribute region chroma QP delta syntax element. The G-PCC decoder may inverse quantize a quantized luma attribute value for the point based on the luma QP for the point. The G-PCC decoder may inverse quantize a quantized chroma attribute value for the point based on the chroma QP for the point. Thus, there may be separate luma and chroma QPs for a region, which may produce better quality and/or better levels of compression.

FIG. 1 is a block diagram illustrating an example encoding and decoding system 100 that may perform the techniques of this disclosure. The techniques of this disclosure are generally directed to coding (encoding and/or decoding) point cloud data. The coding may be effective in compressing and/or decompressing point cloud data. In general, point cloud data includes any data for processing a point cloud.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to high level syntax for geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to high level syntax for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data source. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, surveillance, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard of a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. Source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of current approaches and will target creation of a standard. The group is working together on this exploration activity in a collaborative effort known as the 3-Dimensional Graphics Team (3DG) to evaluate compression technology designs proposed by their experts in this area. The 3DG group has been renamed as ISO/IEC JTC 1/SC 29/WG 7 3DG.

Point cloud compression activities are categorized in two different approaches. The first approach is "video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "geometry-based point cloud compression" (G-PCC), which directly compresses 3D geometry, i.e., position of a set of points in 3D space, and associated attribute values (for each point associated with the 3D geometry). G-PCC addresses the compression of point clouds in both Category 1 (static point clouds) and Category 3 (dynamically acquired point clouds). G-PCC Future Enhancements, ISO/IEC JTC1/SC29/WG11 w18887, Geneva, Switzerland, October 2019 (hereinafter, w18887), is a recent draft of the G-PCC standard. G-PCC Codec Description v5, ISO/IEC JTC1/SC29/WG11 w18891, Geneva, Switzerland, October 2019 (hereinafter, w18891), is a description of the codec.

A point cloud contains a set of points in a 3D space and may have attributes associated with the point. The attributes may be or include color information such as R, G, B or Y, Cb, Cr, or reflectance information, or other data. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
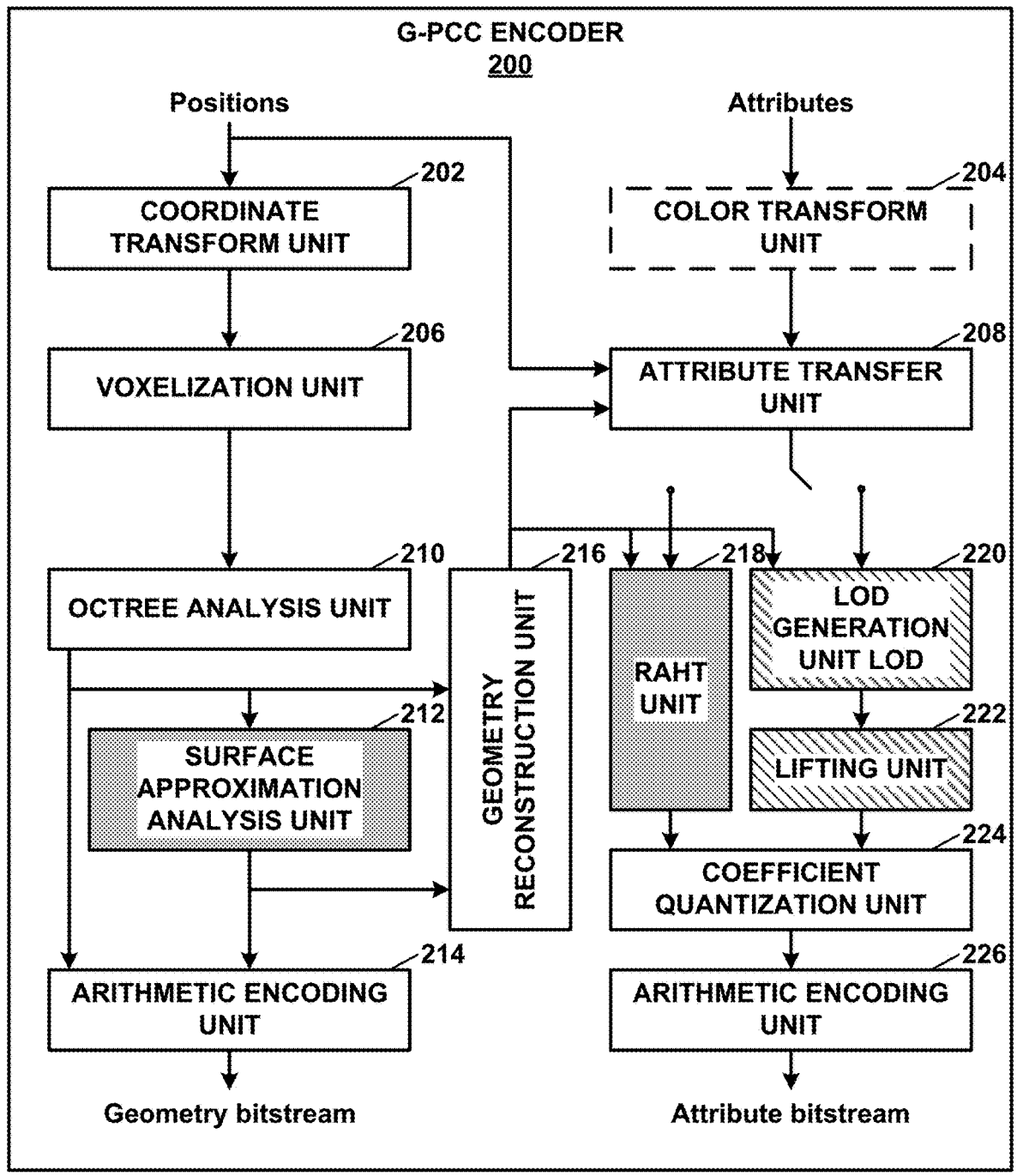
FIG. 2 is a block diagram illustrating an example Geometry Point Cloud Compression (G-PCC) encoder.
Figure 3:
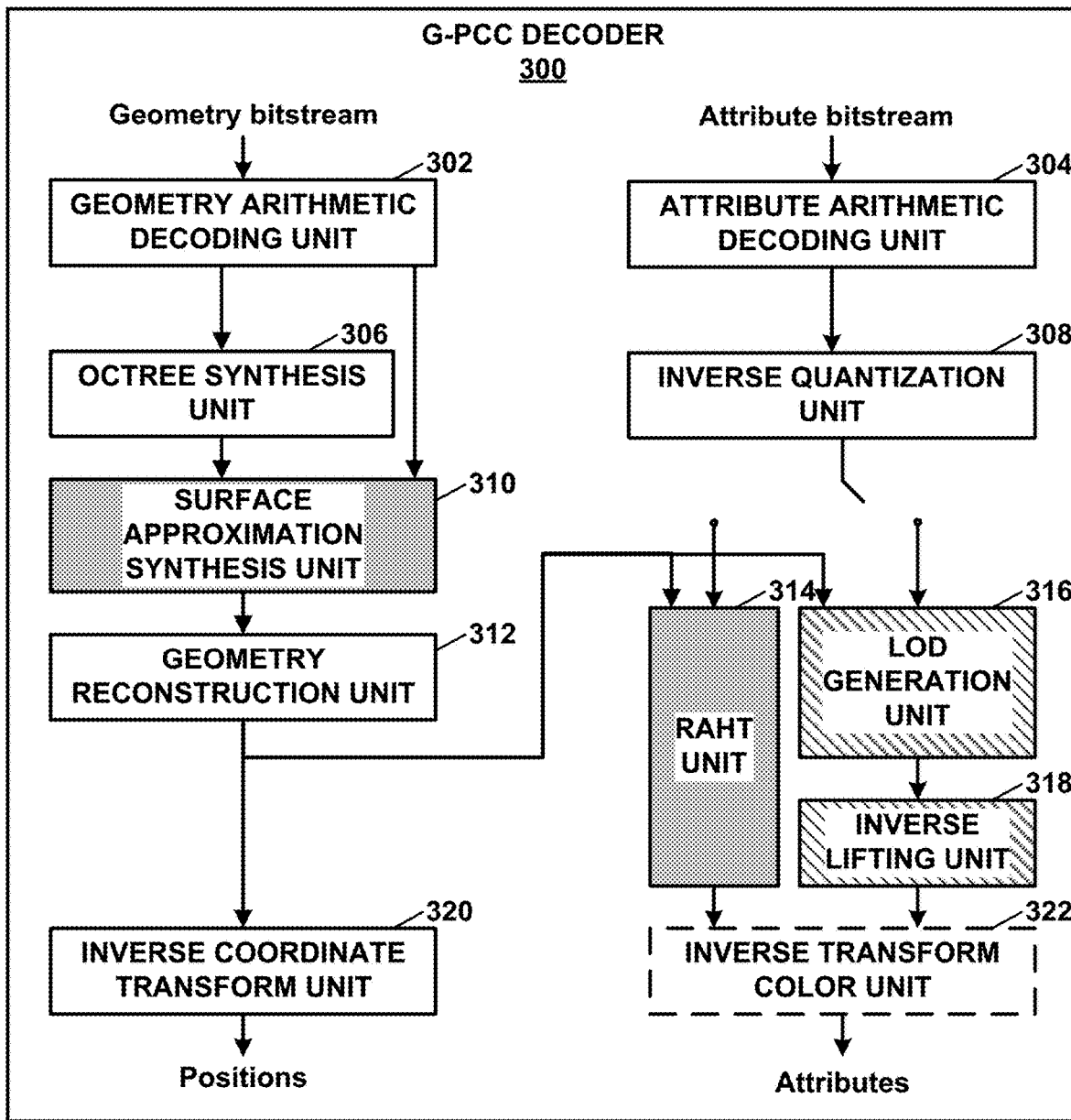
FIG. 3 is a block diagram illustrating an example G-PCC decoder.

FIG. 2 provides an overview of G-PCC encoder 200. FIG. 3 provides an overview of G-PCC decoder 300. The modules in FIG. 2 and FIG. 3 are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3. See G-PCC Future Enhancements, ISO/IEC JTC1/SC29/WG11 w18887, Geneva, Switzerland, October 2019.

For Category 1 and Category 3 data, the compressed geometry is typically represented as an octree from the root all the way down to a leaf level of individual voxels. For some Category 1 data, the compressed geometry may be represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may, in addition, approximate the voxels within each leaf with a surface model. The surface model used is a triangulation comprising 1-10 triangles per block, resulting in a triangle soup. The geometry coding method that uses the surface approximation is referred to as Trisoup geometry coding, while the geometry coding method that uses the full-octree model is known as the Octree geometry coding. In typical cases, trisoup geometry coding may also be used to indicate cases where the octree is partly coded with octree and partly with trisoup.

At each node of an octree, an occupancy is signaled (when not inferred) for one or more of its child nodes (up to eight nodes). Occupancy refers to whether there is one or more points in the node. Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the user (e.g., G-PCC encoder 200) has the option to choose which of the 3 attribute codecs to use.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residual obtained as the output of the coding methods for the attributes are quantized. The residuals may be obtained by subtracting the attribute value from a prediction that is derived based on the points in the neighborhood of the current point and based on the attribute values of points encoded previously. The quantized residual may be coded using context adaptive arithmetic coding.

In accordance with one or more techniques of this disclosure, G-PCC decoder 300 may reconstruct a position of a point of the point cloud and may inverse quantize attribute data for the point. The attribute data for the point may include a luma value (i.e., a luma attribute value) and a chroma value (i.e., a chroma attribute value). As part of inverse quantizing the attribute data, G-PCC decoder 300 may clip a luma QP value and clip a chroma QP value. Clipping is a process that sets a value to an upper end of a range if the value is above the upper end of the range and sets the value to a lower end of the range if the value is below the lower end of the range, and does not change the value if the value is between the upper and lower ends of the range. Furthermore, as part of inverse quantizing the attribute data, G-PCC decoder 300 may inverse quantize the luma value based on the clipped luma QP value and may inverse quantize the chroma value based on the clipped chroma QP value. By clipping the luma QP value and clipping the chroma QP value, it may be unnecessary to determine during a bitstream conformance test whether the luma QP value and the chroma QP value are within the valid range. This may accelerate the bitstream conformance testing process and may conserve computing resources.

In some examples, G-PCC decoder 300 may reconstruct a position of a point of the point cloud and may determine a quantized attribute value for the point. G-PCC decoder 300 may also derive a QP bit depth offset for the point. Additionally, G-PCC decoder 300 may derive a QP range for the point based on the QP bit depth offset for the point. G-PCC decoder 300 may determine a quantization step size for the point based on the QP range for the point. Furthermore, G-PCC decoder 300 may inverse quantize the quantized attribute value for the point based on the quantization step size for the point. The use of the QP bit depth offset may allow for coding of attribute coefficients with bit depths greater than 8 bits. This may enable more precision and accuracy in decoded attribute coefficients.

In some examples, G-PCC encoder 200 may quantize a luma attribute value for a point in the point cloud based on a luma QP for the point and may quantize a chroma attribute value for the point based on a chroma QP for the point. G-PCC encoder 200 may signal, in a bitstream, data representing the quantized luma attribute value for the point and the quantized chroma attribute value for the point. Additionally, G-PCC encoder 200 may signal, in the bitstream, an attribute region luma QP delta syntax element that specifies a delta QP from a slice luma QP of a region. G-PCC encoder 200 may signal, in the bitstream, an attribute region chroma QP delta syntax element that specifies a delta QP from a slice chroma QP of the region.

Similarly, G-PCC decoder 300 may obtain, from a bitstream, an attribute region luma QP delta syntax element that specifies a delta QP from a slice luma QP of a region. G-PCC decoder 300 may obtain, from the bitstream, an attribute region chroma QP delta syntax element that specifies a delta QP from a slice chroma QP of the region. G-PCC decoder 300 may determine a luma QP for a point of the point cloud based on the attribute region luma QP delta syntax element. Additionally, G-PCC decoder 300 may determine a chroma QP for the point based on the attribute region chroma QP delta syntax element. G-PCC decoder 300 may inverse quantize a quantized luma attribute value for the point based on the luma QP for the point. G-PCC decoder 300 may inverse quantize a quantized chroma attribute value for the point based on the chroma QP for the point. Thus, there may be separate luma and chroma QPs for a region, which may produce better quality and/or better levels of compression.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes (i.e., attribute values, which may also be referred to as attribute coefficients). Coefficient quantization unit 224 may quantize the attribute coefficients generated by RAHT unit 218 or lifting unit 222. Arithmetic encoding unit 226 may apply arithmetic encoding to syntax elements representing the quantized attribute coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream and an attribute bitstream (e.g., from input interface 122 (FIG. 1)). Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize quantized attribute values. Inverse quantizing a quantized attribute value for a point may involve multiplying the quantized attribute value by a QP step size applicable to the point (i.e., a QP step size for the point). The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as one or more processors implemented in circuitry, such as fixed-function circuits, programmable circuits, or a combination thereof. Fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
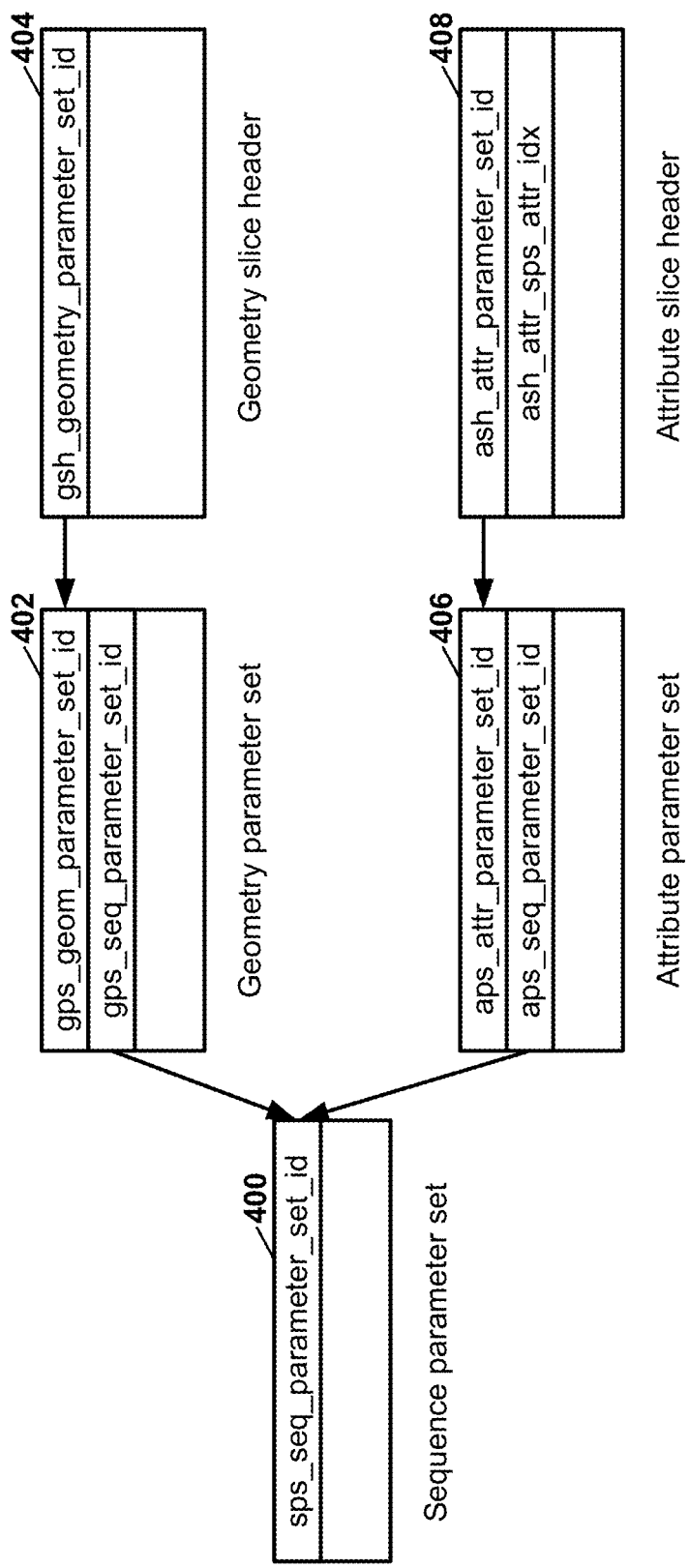
FIG. 4 is a conceptual diagram illustrating a relationship between a sequence parameter set, a geometry parameter set, a geometry slice header, an attribute parameter set, and an attribute slice header.

FIG. 4 is a conceptual diagram illustrating a relationship between a sequence parameter set 400, a geometry parameter set 402, a geometry slice header 404, an attribute parameter set 406, and an attribute slice header 408. G-PCC encoder 200 may use parameter sets, such as sequence parameter set 400, geometry parameter set 402, geometry slice header 404, attribute parameter set 406, and attribute slice header 408, to convey higher-level syntax elements. In other words, the syntax elements in these parameter set may be applicable at a higher level than individual slices, points, or attributes.

As shown in the example of FIG. 4, geometry slice header 404 may refer to geometry parameter set 402, which may in turn refer to sequence parameter set 400. Specifically, geometry slice header 404 includes a syntax element gsh_geometry_parameter_set_id that specifies a value equal to a gps_geom_parameter_set_id syntax element of geometry parameter set 402; geometry parameter set 402 includes a gps_seq_parameter_set_id syntax element that specifies a value equal to a sps_seq_parameter_set_id syntax element of sequence parameter set 400. Attribute slice header 408 may refer to attribute parameter set 406, which in turn may refer to sequence parameter set 400. Specifically, attribute slice header 408 includes a syntax element ash_attr_parameter_set_id that specifies a value equal to an aps_attr_parameter_set_id syntax element of attribute parameter set 406; attribute parameter set 406 includes an aps_seq_parameter_set_id syntax element that specifies a value equal to the sps_seq_parameter_set_id syntax element of sequence parameter set 400.

This disclosure describes techniques that extend the attribute quantization process in G-PCC to support various bitdepths, and also describes techniques that include the application of clipping operations to ensure the validity of the quantization parameters. Attribute coding in G-PCC involves a quantization/inverse-quantization process that enables the codec to trade between the reconstructed quality of the attributes of the point cloud and the bits required to represent them. Quantization parameters (QP) are used to control this trade-off by determining the particular scaling operations to be performed on the attributes. The QPs are signaled in the bitstream.

For attributes, in w18887, QPs are signaled as follows:
Initial QP value (aps_attr_initial_qp and aps_attr_chroma_qp offset) in the Attribute Parameter Set (APS).
Delta QP value (ash_attr_qp_delta_luma and ash_attr_qp_delta_chroma) in the Attribute Slice Header (ASH).
Delta QP value per layer (ash_attr_layer_qp_delta_luma and ash_attr_layer_qp_delta_chroma) in the ASH.
Delta QP value for a region (ash_attr_region_qp_delta) in the slice header.

A QP value is eventually derived from the above QPs using the variable SliceQpY[ ] and SliceQpC[ ] for each layer. The QP value thus calculated includes the initial QP value, delta QP values and per-layer delta QP values. In w18887, the SliceQpY[ ] and SliceQpC[ ] thus derived are constrained to be in the range of 4 to 51, inclusive.

The derivation of QP values described above may have a few shortcomings. For example, the constraint does not include the region QP delta value which may take the QP value outside the valid range. Furthermore, in order to satisfy the above constraint, encoders and decoders have to ensure that the QP values signaled across the different levels all satisfy the constraint. It may be simpler to clip the value cumulative QP across the various levels to be within the QP range of 4 to 51, inclusive.

Additionally, the current QP range of 4 to 51 may be sufficient to code 8-bit content. However, more generic content is likely to have bitdepth beyond 8 bits, and it may be necessary to have QPs that support higher bitdepth values to be coded with similar precision as 8-bit content. Using the same QP range will result in coarse representations of higher bitdepth content not being represented.

Within a slice, a QP offset (regionDeltaQp) is signaled that applies to both the luma and chroma components. For certain content, it may not be sufficient to only signal one offset for both the chroma and the luma components. The characteristics/statistics of the content may necessitate different offsets to be applied for the luma and chroma components.

This disclosure discusses several techniques that may address one or more of the shortcomings discussed above. A first technique clarifies the range of the QP values as currently defined in the G-PCC working draft (i.e., w18887), and applies clipping operations to ensure that the QP values are within the valid range. A second technique extends the QP values to efficiently support attributes that are beyond 8 bits in precision. A third technique signals a different value for luma and chroma for region-specific QP offset. The techniques may be used together or separately. Throughout this disclosure <M> . . . <M> tags denote modified text in w18887 and <D> . . . </D> tags denote text deleted from w18887.

In accordance with the first technique of this disclosure, inverse quantization unit 308 clips the QP to ensure that the QPs are in the valid range. To implement the first technique of this disclosure, the following changes may be applied to w18887.

1. The value of range of aps_attr_initial_qp is modified to be 0 to 51, inclusive.

aps_attr_initial_qp specifies the initial value of the variable SliceQp for each slice referring to the APS. The initial value of SliceQp is modified at the attribute slice segment layer when a non-zero value of slice_qp_delta_luma or slice_qp_delta_luma are decoded. The value of aps_attr_initial_qp shall be in the range of 0 to 5<M>1</M><D>2</D>, inclusive.

2. The following constraint is removed:

<D> The value of SliceQpY[i] and SliceQpC[i] with i=0 . . . num_layer−1 shall be in the range of 4 to 51, inclusive.</D>

3. The QP value used is clipped after considering the region QP delta. The following changes are proposed in Section 8.3.2.6 from w18887:

8.3.2.6 Inverse Quantization Process

Inputs of this process are:

a variable attrCnt specifying the attribute dimension.

a series of quantized attribute coefficients quantAttributeCoefficients[i][a], where i is in the range of 0 to PointNum−1, inclusive, and a in the range 0 to attrCnt−1, inclusive.

a variable FixedPointWeightShift specifying the fixed-point representation precision for quantization weights.

an array of quantization weights quantizationWeights[i], where i is in the range of 0 to PointNum−1, inclusive.

a variable SliceQpY[l] with l=0 . . . num_layer−1 specifying the inverse quantization parameter for the luma coefficient, a variable SliceQpC[l] with l=0 . . . num_layer−1 specifying the inverse quantization parameter for the chroma coefficient, a variable num_layer specifying the number of SliceQpY and SliceQpC, a series of the decoded geometry point PointPos[i][j], where i is in the range of 0 to PointNum−1, inclusive.

a variable regionboxDeltaQp specifying the region box delta quantization parameter.

a variable regionboxX, regionboxY, regionboxZ specifying the region box origin.

a variable regionboxWidth, regionboxHeight, regionboxDepth specifying the region box size.

The output of the process is a series of the unquantized attribute coefficients unquantAttributeCoefficients[i][a], where i is in the range of 0 to PointNum−1, inclusive, and a in the range of 0 to attrCnt−1, inclusive.

The inverse quantization process proceeds as follows.
endIndex=pointCountPerLevelOfDetail[0];
for (i=0, d=0; i<PointNum; i++) {
  if (i==endIndex) {
    endIndex=pointCountPerLevelOfDetail[++d];
    layerQpYlayer=(d<num_layer) ?
SliceQpY[d]:SliceQpY[num_layer−1];
    layerQpClayer=(d<num_layer) ?
SliceQpC[d]:SliceQpC[num_layer−1];
  }
isPointContainedRegionBox=
(regionboxX<=PointPos[i][0]) &&
(PointPos[i][0]<(regionboxX+regionboxWidth))
&& (regionboxY<=PointPos[i][1]) &&
(PointPos[i][1]<(regionboxY+regionboxHeight))
&& (regionboxZ<=PointPos[i][2]) &&
(PointPos[i][2]<(regionboxZ+ regionboxDepth));
qpY=layerQpY+(isPointContainedRegionBox ? regionboxDeltaQp:0);
qpC=layerQpC+(isPointContainedRegionBox ? regionboxDeltaQp: 0);
QstepY=QpToQstep(<M>Clip(</M>qpY<M>, 4, 51)</M>);
QstepC=QpToQstep(<M>Clip(</M>qpC<M>, 4, 51)</M>);
  for (a=0; a<attrCnt; a++)
    unquantAttributeCoefficients [i][a]=
quantAttributeCoefficients[i][a]×
    (a==0 ? QstepY:QstepC);
}

Thus, in one example, G-PCC decoder 300 may reconstruct a position of a point of a point cloud. For instance, geometry arithmetic decoding unit 302, octree synthesis unit 306, surface approximate synthesis unit 310, and/or geometry reconstruction unit 312 may reconstruct the position of the point in the point cloud, e.g., as described above with respect to FIG. 3. G-PCC decoder 300 (e.g., inverse quantization unit 308 of G-PCC decoder 300) may inverse quantize attribute data for the point. In this example, the attribute data for the point may include a luma attribute value and a chroma attribute value. Furthermore, in this example, as part of inverse quantizing the attribute data, inverse quantization unit 308 may clip a luma QP (e.g., determine clip(qpY, 4, 51), as shown in the text above). Additionally, as part of inverse quantizing the attribute data, inverse quantization unit 308 may clip a chroma QP (e.g., determine clip(qpC, 4, 51), as shown in the text above). Furthermore, as part of inverse quantizing the attribute data, inverse quantization unit 308 may inverse quantize the luma attribute value based on the clipped luma QP. For instance, inverse quantization unit 308 may determine a QstepY value and calculate unquantAttributeCoefficients [i][a]=quantAttributeCoefficients[i][a]×QstepY, as shown in the text above. Additionally, as part of inverse quantizing the attribute data, inverse quantization unit 308 may inverse quantize the chroma attribute value based on the clipped chroma QP. For instance, inverse quantization unit 308 may determine a QstepC value and calculate unquantAttributeCoefficients [i][a]=quantAttributeCoefficients[i][a]×QstepC, as shown in the text above.

In accordance with the second technique of this disclosure, the valid QP ranges may be modified to support different bitdepth of attributes. In other words, G-PCC coders may operate according to QP ranges that are modified relative to other techniques. In a first variant of the second technique, the valid QP range of 0 to 51, inclusive, is mainly applicable for 8-bit content. For content with higher precision, a higher QP range may need to be specified in order to obtain similar quantization step size as applicable for the 8-bit content.

To satisfy the same range, one also needs to increase the number of parameters in the QP range. For example, the quantization/inverse-quantization processes are specified such that a change of six values of QP corresponds to a change in precision of 1 bit. Therefore, a linear relationship may be obtained for the QP value range based on the bitdepth as follows:

QP range: 0 . . . 51+6*(bitdepth−8), where bitdepth refers to precision of the coded content. Therefore, for a bitdepth of 10, the QP range will be in the range of 0 to 63, inclusive.

The changes to the G-PCC specification to implement the first variant of the second technique may be as follows. The following semantics are added to the sequence parameter set:

<M> The variable QpBdOffset[i] is derived as 6*(attribute_bitdepth[i]−8) for i in the range of 0 to sps_num_attribute_sets−1, inclusive.

For each attribute with index i, the QP range is derived as 0 to 51+QpBdOffset[i], inclusive. The variables QpMin [i] and QpMax[i] are set equal to 0 and 51+QpBdOffset [i], respectively, for i in the range of 0 to sps_num_attribute_sets−1, inclusive.

Within each attribute set, if a secondary bitdepth is specified, then the QpBdOffsetSecondary[i], QpMinSecondary[i] and QpMaxSecondary[i] are similarly defined using the attribute_bitdepth_secondary[i] syntax element.</M>

The syntax element sps_num_attribute_sets indicates the number of coded attributes in the bitstream. Thus, the QP bit depth offset (e.g., QpBdOffset) for a point based on a bit depth of an attribute dimension.

In some examples, the QpBdOffset[i] is derived ensuring that at least a certain minimum bitdepth is supported, even when the actual bitdepth of the content is different. For example, <M> The variable QpBdOffset[i] is derived as 6*(min(N, attribute_bitdepth[i])−N) for i in the range of 0 to sps_num_attribute_sets−1, inclusive.</M> where N is a fixed value (such as 8).

The following semantics are modified in the attribute parameter set:

aps_attr_initial_qp specifies the initial value of the variable SliceQp for each slice referring to the APS. The initial value of SliceQp is modified at the attribute slice segment layer when a non-zero value of slice_qp_delta_luma or slice_qp_delta_luma are decoded. The value of aps_attr_initial_qp shall be in the range of 0 to 5<M>1</M><D>2</D><M>+QpBdOffset</M>, inclusive.

The following derivation process is modified:

8.3.2.6 Inverse Quantization Process

Inputs of this process are:

a variable attrCnt specifying the attribute dimension.

a series of quantized attribute coefficients quantAttributeCoefficients[i][a], where i is in the range of 0 to PointNum−1, inclusive, and a in the range 0 to attrCnt−1, inclusive.

a variable FixedPointWeightShift specifying the fixed-point representation precision for quantization weights.

an array of quantization weights quantizationWeights[i], where i is in the range of 0 to PointNum−1, inclusive.

a variable SliceQpY[l] with l=0 . . . num_layer−1 specifying the inverse quantization parameter for the luma coefficient, a variable SliceQpC[l] with l=0 . . . num_layer−1 specifying the inverse quantization parameter for the chroma coefficient, a variable num_layer specifying the number of SliceQpY and SliceQpC, a series of the decoded geometry point PointPos[i][j], where i is in the range of 0 to PointNum−1, inclusive.

a variable regionboxDeltaQp specifying the region box delta quantization parameter.

a variable regionboxX, regionboxY, regionboxZ specifying the region box origin.

a variable regionboxWidth, regionboxHeight, regionboxDepth specifying the region box size.

The output of the process is a series of the unquantized attribute coefficients unquantAttributeCoefficients[i][a], where i is in the range of 0 to PointNum−1, inclusive, and a in the range of 0 to attrCnt−1, inclusive.

The inverse quantization process proceeds as follows.

endIndex=pointCountPerLevelOfDetail[0];
for (i=0, d=0; i<PointNum; i++) {
  if (i==endIndex) {
    endIndex=
pointCountPerLevelOfDetail[++d];
    layerQpYlayer=(d<num_layer) ?
SliceQpY[d]:SliceQpY[num_layer−1];
    layerQpClayer=(d<num_layer) ?
SliceQpC[d]:SliceQpC[num_layer−1];
  }
isPointContainedRegionBox=
(regionboxX<=PointPos[i][0]) &&
(PointPos[i][0]<(regionboxX+regionboxWidth))
&& (regionboxY<=PointPos[i][1]) &&
(PointPos[i][1]<(regionboxY+regionboxHeight))
&& (regionboxZ<=PointPos[i][2]) &&
(PointPos[i][2]<(regionboxZ+ regionboxDepth));
qpY=layerQpY+(isPointContainedRegionBox ?
regionboxDeltaQp:0);
qpC=layerQpC+(isPointContainedRegionBox ?
regionboxDeltaQp:0);
QstepY=QpToQstep(<M>Clip(</M>qpY<M>,</M>
<M>QpMin[ash_attr_sps_attr_idx],</M>
<M>QpMax[ash_attr_sps_attr_idx])</M>);
QstepC=QpToQstep(<M>Clip(</M>qpC,
<M>QpMinSecondary[ash_attr_sps_attr_idx],</M>
<M>QpMaxSecondary[ash_attr_sps_attr_idx])</M>);
  for (a=0; a<attrCnt; a++)
    unquantAttributeCoefficients [i][a]=
quantAttributeCoefficients[i][a]×
    (a==0 ? QstepY:QstepC);
}

Thus, in accordance with the first variation of the second technique, G-PCC decoder 300 may reconstruct a position of a point of the point cloud. For instance, geometry reconstruction unit 312 (FIG. 3) of G-PCC decoder 300 may reconstruct the position of the point. Furthermore, G-PCC decoder 300 may determine a quantized attribute value for the point. In some examples, attribute arithmetic decoding unit 304 may determine the quantized attribute value for the point based on data in an attribute bitstream. For instance, attribute arithmetic decoding unit 304 may apply arithmetic decoding to one or more syntax elements in the attribute bitstream to determine the quantized attribute value for the point.

Additionally, inverse quantization unit 308 of G-PCC decoder 300 may derive a QP bit depth offset (QpBdOffset) for the point. For instance, inverse quantization unit 308 may derive the QP bit depth offset as 6*(attribute_bitdepth[i]−8), where attribute_bitdepth is a bit depth for attribute dimension i.

Furthermore, inverse quantization unit 308 may derive a QP range for the point based on the QP bit depth offset for the point. For instance, in an example where the quantized attribute value is a luma attribute value, inverse quantization unit 308 may derive a value in array QpMin[i], where i is an index of the luma attribute value, the value of QpMin[i] is equal to 0. Additionally, in this example, inverse quantization unit 308 may derive a value in an array QpMax [i], the value of QpMax[i] is equal to 51 plus the QP bit depth offset for the luma attribute value. The QP range for the point as QpMin[ash_attr_sps_attr_idx] to QpMax[ash_attr_sps_attr_idx], where ash_attr_sps_attr_idx is an index of the attribute.

In an example where the quantized attribute value is a chroma attribute, inverse quantization unit 308 may derive a value in an array QpMinSecondary[i], where i in an index of the chroma attribute value, the value of QpMinSecondary [i] is equal to 0. Additionally, in this example, inverse quantization unit 308 may derive a value in an array QpMaxSecondary[i], where the value of QpMaxSecondary[i] is equal to 51 plus the QP bit depth offset. The QP range for the point as QpMinSecondary[ash_attr_sps_attr_idx] to QpMaxSecondary[ash_attr_sps_attr_idx], where ash_attr_sps_attr_idx is an index of the attribute type.

Furthermore, inverse quantization unit 308 may determine a quantization step size for the point based on the QP range for the point. For example, inverse quantization unit 308 may clip a QP to the determined range and apply a function that maps the clipped QP to a quantization step size. For instance, inverse quantization unit 308 may determine a quantization step size QstepY as QpToQstep(Clip(qpY, QpMin[ash_attr_sps_attr_idx], QpMax[ash_attr_sps_attr_idx])) or a quantization step size QstepC as QpToQstep (Clip(qpC, QpMinSecondary[ash_attr_sps_attr_idx], QpMaxSecondary[ash_attr_sps_attr_idx])).

Inverse quantization unit 308 may inverse quantize the quantized attribute value for the point based on the quantization step size for the point. For instance, inverse quantization unit 308 may inverse quantize the quantized attribute value quantAttributeCoefficients[i][a] as unquantAttributeCoefficients [i][a]=quantAttributeCoefficients[i][a]×(a==0 ? QstepY:QstepC).

A second variant of the second technique also extends the QP range based on the bit depth. However, instead of keeping the minimum value of the range constant and increasing the maximum value of the range with bitdepth (as in the first variant of the second technique), the maximum value is kept constant and the minimum value is modified with bitdepth. The QP range may therefore be specified as follows:

QP range: −6*(bitdepth−8) to 51, inclusive.

Therefore, for a bitdepth of 10, the QP range will be in the range of −12 to 51, inclusive.

A benefit of such a representation may be that the same QP value represents similar relative quality when content is coded in different bitdepths. So, if there is content that has a bit depth of 10 bits and the same content is also coded with a bit depth of 8, then a QP value of 8 (either in the 10 bit representation or the 8-bit representation) will have similar quality. Example changes to the G-PCC specification may be as follows:

The following semantics are added to the sequence parameter set:
<M> The variable QpBdOffset[i] is derived as 6*(attribute_bitdepth[i]−8) for i in the range of 0 to sps_num_attribute_sets−1, inclusive.

For each attribute with index i, the QP range is derived as −QpBdOffset[i] to 51, inclusive. The variables QpMin [i] and QpMax[i] are set equal to −QpBdOffset[i] and 51, respectively, for i in the range of 0 to sps_num_attribute_sets−1, inclusive.

Within each attribute set, if a secondary bitdepth is specified, then the QpBdOffsetSecondary[i], QpMinSecondary[i] and QpMaxSecondary[i] are similarly defined using the attribute_bitdepth_secondary[i] syntax element.</M>

The following semantics are modified in the attribute parameter set:
aps_attr_initial_qp specifies the initial value of the variable SliceQp for each slice referring to the APS. The initial value of SliceQp is modified at the attribute slice segment layer when a non-zero value of slice_qp_delta_luma or slice_qp_delta_luma are decoded. The value of aps_attr_initial_qp shall be in the range of <M>−QpBdOffset</M> to 51, inclusive.

The following derivation process is modified:
8.3.2.6 Inverse quantization process
Inputs of this process are:
a variable attrCnt specifying the attribute dimension.
a series of quantized attribute coefficients quantAttributeCoefficients[i][a], where i is in the range of 0 to PointNum−1, inclusive, and a in the range 0 to attrCnt−1, inclusive.
a variable FixedPointWeightShift specifying the fixed-point representation precision for quantization weights.
an array of quantization weights quantizationWeights[i], where i is in the range of 0 to PointNum−1, inclusive.
a variable SliceQpY[l] with l=0 . . . num_layer−1 specifying the inverse quantization parameter for the luma coefficient,
a variable SliceQpC[l] with l=0 . . . num_layer−1 specifying the inverse quantization parameter for the chroma coefficient,
a variable num_layer specifying the number of SliceQpY and SliceQpC,
a series of the decoded geometry point PointPos[i][j], where i is in the range of 0 to PointNum−1, inclusive.
a variable regionboxDeltaQp specifying the region box delta quantization parameter.
a variable regionboxX, regionboxY, regionboxZ specifying the region box origin.
a variable regionboxWidth, regionboxHeight, regionboxDepth specifying the region box size.
The output of the process is
a series of the unquantized attribute coefficients unquantAttributeCoefficients[i][a], where i is in the range of 0 to PointNum−1, inclusive, and a in the range of 0 to attrCnt−1, inclusive. The inverse quantization process proceeds as follows.
endIndex=pointCountPerLevelOfDetail[0];
for (i=0, d=0; i<PointNum; i++) {
 if (i==endIndex) {
  endIndex=pointCountPerLevelOfDetail[++d];
  layerQpYlayer=(d<num_layer) ?
SliceQpY[d]:SliceQpY[num_layer−1];
  layerQpClayer=(d<num_layer) ?
SliceQpC[d]:SliceQpC[num_layer−1];
 }
isPointContainedRegionBox=
(regionboxX<=PointPos[i][0]) &&
(PointPos[i][0]<(regionboxX+regionboxWidth))
&& (regionboxY<=PointPos[i][1]) &&
(PointPos[i][1]<(regionboxY+regionboxHeight))
&& (regionboxZ<=PointPos[i][2]) &&
(PointPos[i][2]<(regionboxZ+regionboxDepth));
qpY=layerQpY+(isPointContainedRegionBox ?
regionboxDeltaQp:0);
qpC=layerQpC+(isPointContainedRegionBox ?
regionboxDeltaQp:0);
QstepY=QpToQstep(<M>Clip(</M>qpY<M>,</M>
<M>QpMin[ash_attr_sps_attr_idx],
QpMax[ash_attr_sps_attr_idx])+
QpBdOffset[ash_attr_sps_attr_idx]</M>);

QstepC=QpToQstep(<M>Clip(</M>qpC,
<M>QpMinSecondary[ash_attr_sps_attr_idx],
QpMaxSecondary[ash_attr_sps_attr_idx])+
QpBdOffsetSecondary[ash_attr_sps_attr_idx]</M>);
    for (a=0; a<attrCnt; a++)
        unquantAttributeCoefficients [i][a]=
quantAttributeCoefficients[i][a]×
    (a==0 ? QstepY:QstepC);
}

In a third variant of the second technique, G-PCC coders may operate using bit depths that are increased by modifying both the lower and higher values of the QP range. For example, the QP range may be modified to be −QpBdOffset/2 to 51+QpBdOffset/2. The Clip function may also be modified to clip the values of QP to the above range. The changes to the QP step may be as follows:
QstepY=QpToQstep(<M>Clip(</M>qpY<M>,
QpMin[ash_attr_sps_attr_idx],</M><M>QpMax[ash_attr_sps_attr_idx])
+QpBdOffset[ash_attr_sps_attr_idx]/2</M>);
QstepC=QpToQstep(<M>Clip(</M>
qpC,<M>QpMinSecondary[ash_attr_sps_attr_idx],
QpMaxSecondary[ash_attr_sps_attr_idx])+
QpBdOffsetSecondary[ash_attr_sps_attr_idx]/2</M>);

In this way, in some examples of the second technique, G-PCC decoder 300 may reconstruct a position of a point of a point cloud. For instance, geometry arithmetic decoding unit 302, octree synthesis unit 306, surface approximate synthesis unit 310, and/or geometry reconstruction unit 312 may reconstruct the position of the point in the point cloud. Furthermore, G-PCC decoder 300 (e.g., attribute arithmetic decoding unit 304 of decoder 300) may determine a quantized attribute value for the point. G-PCC decoder 300 (e.g., inverse quantization unit 308 of decoder 300) may also derive a QP bit depth offset for the point. Additionally, G-PCC decoder 300 (e.g., inverse quantization unit 308 of decoder 300) may derive a QP range for the point based on the QP bit depth offset for the point. G-PCC decoder 300 (e.g., inverse quantization unit 308 of decoder 300) may determine a quantization step size for the point based on the QP range for the point. G-PCC decoder 300 (e.g., inverse quantization unit 308 of decoder 300) may then inverse quantize the quantized attribute value for the point based on the quantization step size for the point.

In this example, the quantized attribute value may be a quantized luma attribute value for the point and G-PCC decoder 300 may determine a quantized chroma attribute value for the point. G-PCC decoder 300 may also derive a chroma QP bit depth offset for the point and derive a chroma QP range for the point based on the chroma QP bit depth offset for the point. G-PCC decoder 300 may determine a chroma quantization step size for the point based on the chroma QP range for the point. Additionally, G-PCC decoder 300 may inverse quantize the quantized chroma attribute value for the point based on the chroma quantization step size for the point.

Furthermore, in some such examples (e.g., the first variant of the second technique), G-PCC decoder 300 may derive the QP range for the point as 0 to a value plus the QP bit depth offset for the point. In some such examples (e.g., second variant of the second technique), G-PCC decoder 300 may derive the QP range for the point as a negative of the QP bit depth offset for the point to a maximum value. In some such examples (e.g., the third variant of the second technique), G-PCC decoder 300 may derive a lower limit of the QP range for the point based on the QP bit depth offset for the point and may derive an upper limit of the QP range for the point based on the QP bit depth offset for the point. In such examples, as part of determining the quantization step size for the point, G-PCC decoder 300 may clip a QP to the QP range for the point.

In accordance with a third technique of this disclosure, a separate QP offset/delta QP is signaled for luma and chroma for regions within slices in a G-PCC bitstream. For instance, the following modifications may be made to w18887 to implement separate QP offsets (or delta QPs) for luma and chroma for regions.

|  | Descriptor |
|---|---|
| attribute_slice_header( ) { |  |
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { |  |
|     ash_attr_qp_delta_luma | se(v) |
|     ash_attr_qp_delta_chroma | se(v) |
|   } |  |
|   ash_attr_layer_qp_delta_present_flag | u(1) |
|   if ( ash_attr_layer_qp_delta_present_flag ) { |  |
|     numLayers = aps.attr_encoding = = 1 ? aps.raht_depth + 1 : aps.num_detail_levels + 1 |  |
|     for( i = 0; i < numLayers; i++ ){ |  |
|       ash_attr_layer_qp_delta_luma[i] | se(v) |
|       ash_attr_layer_qp_delta_chroma[i] | se(v) |
|     } |  |
|   } |  |
|   ash_attr_region_qp_delta_present_flag | u(1) |
|   if ( ash_attr_region_qp_delta_present_flag ) { |  |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_<M>luma_</M>qp_delta | se(v) |
|     <M>ash_attr_region_chroma_qp_delta</M> | <M>se(v)</M> |
|   } |  |
|   byte_alignment( ) |  |
| } |  | ash_attr_region_<M>luma_</M>qp_delta specifies the delta qp from the SliceQpY[i]<D> and SliceQpC[i]</D> (with i=0 . . . num_layer−1) of the region specified by ash_attr_qp_region_box. When not present, the value of ash_attr_region_qp_delta is inferred to be 0.

regionbox<M>Luma</M>DeltaQp=ash_attr_region_<M>luma_</M>qp_delta

<M>ash_attr_region_chroma_qp_delta specifies the delta qp from the SliceQpC[i] (with i=0 . . . num_layer−1) of the region specified by ash_attr_qp_region_box. When not present, the value of ash_attr_region_qp_delta is inferred to be 0.

regionboxChromaDeltaQp=ash_attr_region_chroma_qp_delta</M>

8.3.2.6 Inverse quantization process
Inputs of this process are:
a variable attrCnt specifying the attribute dimension.
a series of quantized attribute coefficients quantAttributeCoefficients[i][a], where i is in the range of 0 to PointNum−1, inclusive, and a in the range 0 to attrCnt−1, inclusive.
a variable FixedPointWeightShift specifying the fixed-point representation precision for quantization weights.
an array of quantization weights quantizationWeights[i], where i is in the range of 0 to PointNum−1, inclusive.

a variable SliceQpY[l] with l=0 ... num_layer−1 specifying the inverse quantization parameter for the luma coefficient, a variable SliceQpC[l] with l=0 ... num_layer−1 specifying the inverse quantization parameter for the chroma coefficient, a variable num_layer specifying the number of SliceQpY and SliceQpC, a series of the decoded geometry point PointPos[i][j], where i is in the range of 0 to PointNum−1, inclusive.

a variable regionboxDeltaQp specifying the region box delta quantization parameter.

a variable regionboxX, regionboxY, regionboxZ specifying the region box origin.

a variable regionboxWidth, regionboxHeight, regionboxDepth specifying the region box size.

The output of the process is a series of the unquantized attribute coefficients unquantAttributeCoefficients[i][a], where i is in the range of 0 to PointNum−1, inclusive, and a in the range of 0 to attrCnt−1, inclusive.

The inverse quantization process proceeds as follows.

```
endIndex=pointCountPerLevelOfDetail[0];
for (i=0, d=0; i<PointNum; i++) {
  if (i==endIndex) {
    endIndex=pointCountPerLevelOfDetail[++d];
    layerQpYlayer=(d<num_layer) ? SliceQpY[d]:
SliceQpY[num_layer−1];
    layerQpClayer=(d<num_layer) ? SliceQpC[d]:
SliceQpC[num_layer−1];
  }
  isPointContainedRegionBox=
(regionboxX<=PointPos[i][0]) && (PointPos[i][0]<
(regionboxX+regionboxWidth))
&& (regionboxY<=PointPos[i][1]) && (PointPos[i][1]<
(regionboxY+regionboxHeight))
&& (regionboxZ<=PointPos[i][2]) && (PointPos[i][2]<
(regionboxZ+regionboxDepth));
  qpY=layerQpY+(isPointContainedRegionBox ?
regionbox<M>Luma</M>DeltaQp:0);
  qpC=layerQpC+(isPointContainedRegionBox ?
regionbox<M>Chroma<M>DeltaQp:0);
  QstepY=QpToQstep(qpY);
  QstepC=QpToQstep(qpC);
  for (a=0; a<attrCnt; a++)
    unquantAttributeCoefficients [i][a]=
quantAttributeCoefficients[i][a]×(a==0 ? QstepY:QstepC);
```

In the above example, two region delta QP values are signaled: one for luma and one for chroma. The region delta QP value for chroma is applied to both Cb and Cr. In some examples, the region delta QP may be signaled for each dimension associated with the attribute. For example, a region delta QP may be signaled for each luma, Cb and Cr components of the colour attribute (here colour attribute has 3 dimensions); another example is where region delta QP may be signaled for each R, G, and B components of the colour attribute (here again, this color attribute has 3 dimensions).

In this way, in some instances of the third technique of this disclosure, G-PCC encoder 200 (e.g., coefficient quantization unit 224 of G-PCC encoder 200) may quantize a luma attribute value for a point in a point cloud based on a luma QP for the point. Additionally, G-PCC encoder 200 (e.g., coefficient quantization unit 224 of encoder 200) may quantize a chroma attribute value for the point based on a chroma QP for the point. Furthermore, G-PCC encoder 200 may signal, in a bitstream, data representing the quantized luma attribute value for the point and the quantized chroma attribute value for the point. G-PCC encoder 200 may also signal, in the bitstream, an attribute region luma QP delta syntax element (e.g., ash_attr_region_luma_qp_delta) that specifies a delta QP from a slice luma QP of a region. G-PCC encoder 200 may signal, in the bitstream, an attribute region chroma QP delta syntax element (e.g., ash_attr_region_chroma_qp_delta) that specifies a delta QP from a slice chroma QP of the region.

In some instances of the third technique of this disclosure, G-PCC decoder 300 may obtain, from a bitstream, an attribute region luma QP delta syntax element that specifies a delta QP from a slice luma QP of a region (e.g., ash_attr_region_luma_qp_delta). Additionally, G-PCC decoder 300 may obtain, from the bitstream, an attribute region chroma QP delta syntax element that specifies a delta QP from a slice chroma QP of the region (e.g., ash_attr_region_chroma_qp_delta). G-PCC decoder 300 (e.g., inverse quantization unit 308 of decoder 300) may determine a luma QP for a point of the point cloud based on the attribute region luma QP delta syntax element. Similarly, G-PCC decoder 300 (e.g., inverse quantization unit 308 of decoder 300) may determine a chroma QP for the point based on the attribute region chroma QP delta syntax element. G-PCC decoder 300 (e.g., inverse quantization unit 308 of decoder 300) may inverse quantize a quantized luma attribute value for the point based on the luma QP for the point. Additionally, G-PCC decoder 300 (e.g., inverse quantization unit 308 of decoder 300) may inverse quantize a quantized chroma attribute value for the point based on the chroma QP for the point.

Figure 5:
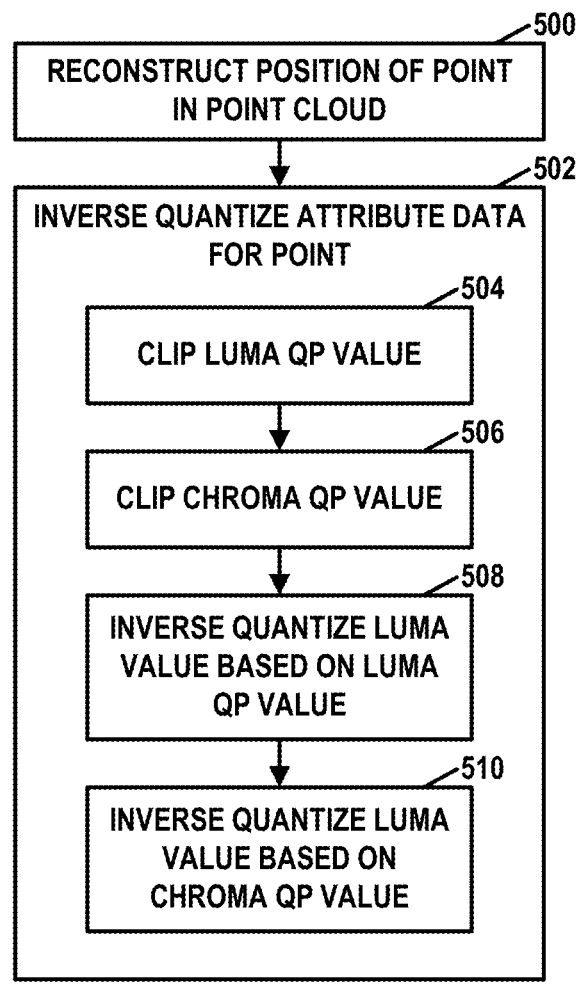
FIG. 5 is a flowchart illustrating an example operation for decoding point cloud data, in accordance with one or more techniques of this disclosure.

FIG. 5 is a flowchart illustrating an example operation for decoding point cloud data, in accordance with one or more techniques of this disclosure. The flowcharts of this disclosure are provided as examples. In other examples, operations may include more, fewer, or different actions or steps. In some examples, actions may be performed in different orders or in parallel. The operations shown in the flowcharts may be performed by one or more processors that are implemented in circuitry.

In the example of FIG. 5, G-PCC decoder 300 may reconstruct a position of a point of the point cloud; (500). For instance, geometry arithmetic decoding unit 302, octree synthesis unit 306, and geometry reconstruction unit 312 may reconstruct the position of the point, e.g., as described above.

Additionally, inverse quantization unit 308 of G-PCC decoder 300 may inverse quantize attribute data for the point (502). In the example of FIG. 5, the attribute data for the point includes a luma attribute value and a chroma attribute value. Inverse quantizing the attribute data for the point may restore the attribute data for the point to an original bit depth of the attribute data for the point.

As part of inverse quantizing the attribute data for the point, inverse quantization unit 308 may clip a luma QP value (504). For instance, inverse quantization unit 308 may clip the luma QP value to a range of 4 to 51. In other words, inverse quantization unit 308 may calculate Clip(qpY, 4, 51). Similarly, as part of inverse quantizing the attribute data for the point, inverse quantization unit 308 may clip a chroma QP value (506). For instance, inverse quantization unit 308 may clip the chroma QP value to a range of 4 to 51. In other words, inverse quantization unit 308 may calculate Clip (qpC, 4, 51). Clipping the luma QP value and the chroma QP value in this way may avoid the need to perform a check during a bitstream conformance process to determine that the luma QP value and the chroma QP value are within the range.

Inverse quantization unit 308 may inverse quantize a quantized luma attribute value for the point based on the luma QP for the point (508). For example, inverse quantization unit 308 may determine a luma QP step size for the point based on the clipped luma QP value for the point. Inverse quantization unit 308 may determine the luma QP step size for the point by looking up the luma QP step size for the point in an array (QpToQstep) that maps QP values to QP step sizes. In this example, inverse quantization unit 308 may inverse quantize the luma attribute value by multiplying the quantized luma attribute value by the luma QP step size for the point.

Similarly, inverse quantization unit 308 may inverse quantize a quantized chroma attribute value for the point based on the chroma QP for the point (510). For example, inverse quantization unit 308 may determine a chroma QP step size for the point based on the clipped chroma QP value for the point. Inverse quantization unit 308 may determine the chroma QP step size for the point by looking up the chroma QP step size for the point in the array (QpToQstep) that maps QP values to QP step sizes. In this example, inverse quantization unit 308 may inverse quantize the chroma attribute value by multiplying the quantized chroma attribute value by the chroma QP step size for the point.

Figure 6:
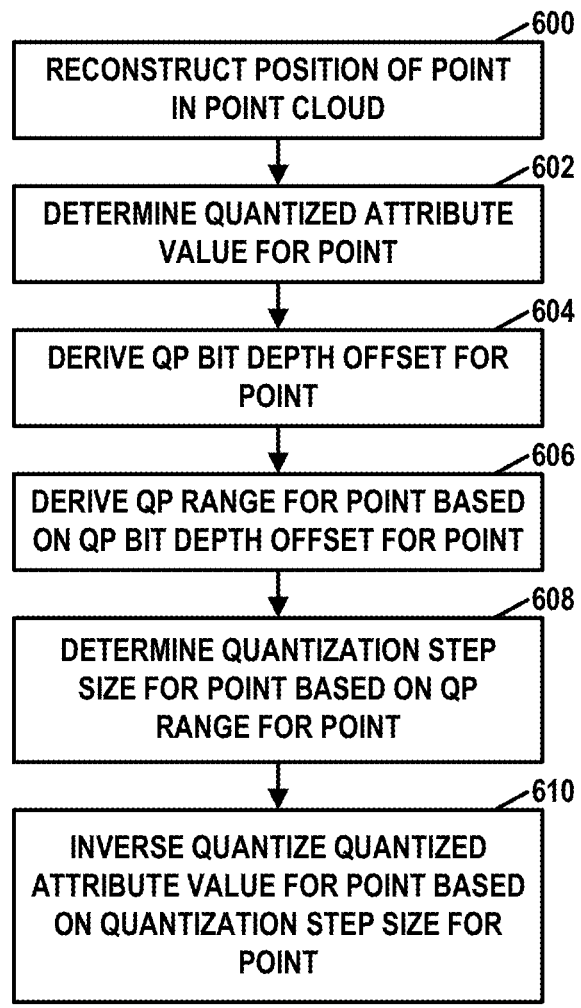
FIG. 6 is a flowchart illustrating an example operation for decoding point cloud data, in accordance with one or more techniques of this disclosure.

FIG. 6 is a flowchart illustrating an example operation for decoding point cloud data, in accordance with one or more techniques of this disclosure. In the example of FIG. 6, G-PCC decoder 300 (e.g., geometry reconstruction unit 312 of G-PCC decoder 300) may reconstruct a position of a point of the point cloud (600). For instance, geometry arithmetic decoding unit 302, octree synthesis unit 306, and geometry reconstruction unit 312 may reconstruct the position of the point, e.g., as described above.

Furthermore, in the example of FIG. 6, attribute arithmetic decoding unit 304 of G-PCC decoder 300 may determine a quantized attribute value for the point (602). For example, attribute arithmetic decoding unit 304 may perform CABAC decoding on one or more syntax elements in the attribute bitstream to determine the quantized attribute value for the point. The attribute value may be a luma or chroma value, an RGB value, a reflectance value, or a value for another type of attribute having one or more dimensions.

Inverse quantization unit 308 of G-PCC decoder 300 may derive a QP bit depth offset for the point (604). If the attribute value is a luma attribute value, the QP bit depth offset for the point may be denoted as QpBdOffset[i], where i is an index of the attribute value. In some examples, inverse quantization unit 308 may derive the QP bit depth offset for the point as 6*(attribute_depth[i]−8), where attribute_depth [i] indicates the bit depth of attribute i for the point. If the attribute value is a chroma attribute value, the QP bit depth offset for the point may be denoted as QpBdOffsetSecondary[i], where i is an index of the attribute value.

Additionally, inverse quantization unit 308 may derive a QP range for the point based on the QP bit depth offset for the point (606). For example, inverse quantization unit 308 may derive the QP range for the point as 0 to a value plus the QP bit depth offset for the point. In other words, for each attribute with index i, inverse quantization unit 308 may derive the QP range for the point as 0 to 51+QpBdOffset[i], inclusive. Thus, if attribute value i is a luma attribute value, inverse quantization unit 308 may set the variables QpMin[i] and QpMax[i] equal to 0 and 51+QpBdOffset[i], respectively. If attribute value i is a chroma attribute value, inverse quantization unit 308 may set the variables QpMinSecondary[i] and QpMaxSecondary[i] equal to 0 and 51+QpBdOffset[i], respectively.

Inverse quantization unit 308 may also determine a quantization step size for the point based on the QP range for the point (608). In some examples, when determining the quantization step size for the point, inverse quantization unit 308 may clip a QP value to the QP range for the point. For example, if the attribute value is a luma attribute value having an index of ash_attr_sps_attr_idx, inverse quantization unit 308 may clip the QP value to a range of QpMin[ash_attr_sps_attr_idx] to QpMax[ash_attr_sps_attr_idx]. In other words, inverse quantization unit 308 may calculate Clip(qpY, QpMin[ash_attr_sps_attr_idx], QpMax[ash_attr_sps_attr_idx]). If the attribute value is a chroma attribute value having an index of ash_attr_sps_attr_idx, inverse quantization unit 308 may clip the QP value to a range of QpMinSecondary[ash_attr_sps_attr_idx] to QpMaxSecondary[ash_attr_sps_attr_idx]. In other words, inverse quantization unit 308 may calculate Clip(qpC, QpMinSecondary[ash_attr_sps_attr_idx], QpMaxSecondary[ash_attr_sps_attr_idx]). After clipping the QP to the range, inverse quantization unit 308 may determine the QP step size (QstepY for luma attribute values or QstepC for chroma attribute values) for the point by looking up the QP step size for the point in an array (QpToQstep) that maps QP values to QP step sizes. In other words, inverse quantization unit 308 may determine QpToQstep(Clip(qpY, QpMin[ash_attr_sps_attr_idx], QpMax[ash_attr_sps_attr_idx])) or may determine QstepC=QpToQstep(Clip(qpC, QpMinSecondary[ash_attr_sps_attr_idx], QpMaxSecondary[ash_attr_sps_attr_idx])). In another example, inverse quantization unit 308 may determine the QP step size for the point using a formula. In some such examples, using the formula may involve the use of one or more look-up tables.

Inverse quantization unit 308 may also inverse quantize the quantized attribute value for the point based on the quantization step size for the point (610). In this example, inverse quantization unit 308 may inverse quantize the attribute value by multiplying the quantized attribute value by the QP step size (e.g., QstepY or QstepC) for the point. In other words, inverse quantization unit 308 may calculate unquantAttributeCoefficients [i][a]=quantAttributeCoefficients[i][a]×(a==0 ? QstepY:QstepC), G-PCC decoder 300 may repeat the process of FIG. 6 for two or more color components. For instance, if steps 600 through 610 are performed for a luma attribute value of a point, G-PCC decoder 300 may also determine a quantized chroma attribute value for the point, derive a chroma QP bit depth offset for the point, derive a chroma QP range for the point based on the chroma QP bit depth offset for the point, determine a chroma quantization step size for the point based on the chroma QP range for the point, and inverse quantize the quantized chroma attribute value for the point based on the chroma quantization step size for the point.

A device, such as destination device 116 (FIG. 1), may use the attribute value of the point to perform various actions. For example, data consumer 118 of destination device 116 may determine a location of a physical object based on the attribute value of the point, present imagery based on the attribute value of the point or perform another type of action. In an example where data consumer 118 presents imagery based on the attribute value of the point, data consumer 118 may display a voxel at a position of the point in a 3-dimensional space as a pixel (when the representation is twodimensional, or when a projection of the position is applied on a 2D plane) having a color based on the attribute value of the point.

Figure 7:
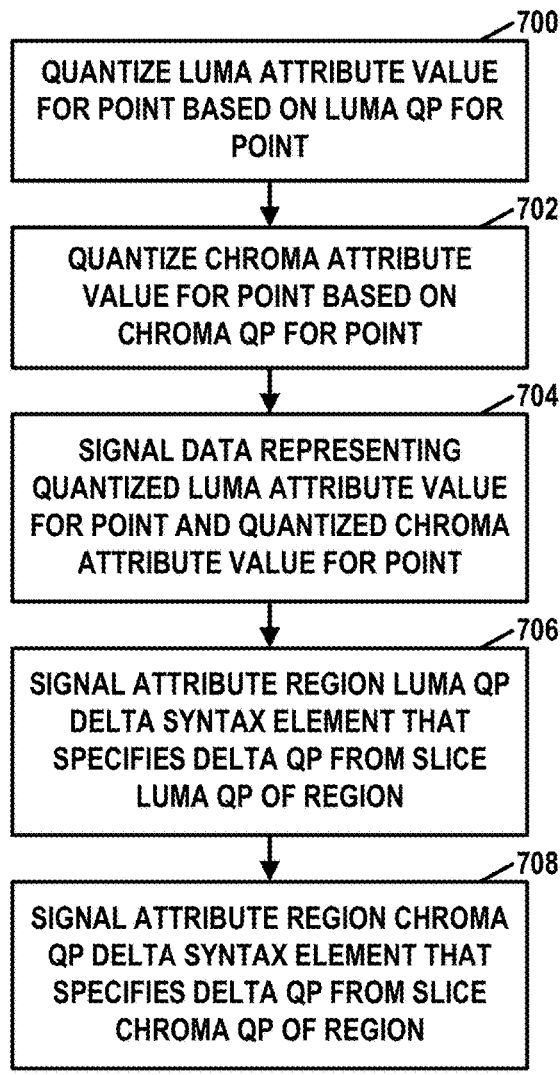
FIG. 7 is a flowchart illustrating an example operation for encoding point cloud data, in accordance with one or more techniques of this disclosure.

FIG. 7 is a flowchart illustrating an example operation for encoding point cloud data, in accordance with one or more techniques of this disclosure. In the example of FIG. 7, coefficient quantization unit 224 of G-PCC encoder 200 may quantize a luma attribute value for a point in the point cloud based on a luma QP for the point (700). For example, coefficient quantization unit 224 may divide the luma attribute value by a quantization step size corresponding to the luma QP for the point. The luma QP for the point is a luma QP that is applicable to the point. Additionally, coefficient quantization unit 224 may quantize a chroma attribute value for the point based on a chroma QP for the point (702). For example, coefficient quantization unit 224 may divide the chroma attribute value by a quantization step size corresponding to the chroma QP for the point.

G-PCC encoder 200 may signal, in a bitstream (e.g., an attribute bitstream), data representing the quantized luma attribute value for the point and the quantized chroma attribute value for the point (704). For example, arithmetic encoding unit 226 may perform arithmetic encoding on one or more syntax elements that represent the quantized luma attribute value for the point and may perform arithmetic encoding on one or more syntax elements that represent the quantized chroma attribute value for the point.

G-PCC encoder 200 may also signal, in the bitstream, an attribute region luma QP delta syntax element (e.g., ash_attr_region_luma_qp_delta) that specifies a delta QP from a slice luma QP of a region (706). The slice luma QP for the region is a luma QP that is specified at a slice level and is applicable to a region (and the rest of the slice) that contains the point. The luma QP delta syntax element indicates a difference (delta) between a luma QP for the region and a slice luma QP (SliceQpY) applicable to the region. G-PCC encoder 200 may also signal, in the bitstream, an attribute region chroma QP delta syntax element (e.g., ash_attr_region_chroma_qp_delta) that specifies a delta QP from a slice chroma QP of the region (708). The slice luma QP for the region is a luma QP that is specified at a slice level and is applicable to a region that contains the point. The chroma QP delta syntax element indicates a difference (delta) between a chroma QP for the region and a slice chroma QP (SliceQpC) applicable to the region.

Figure 8:
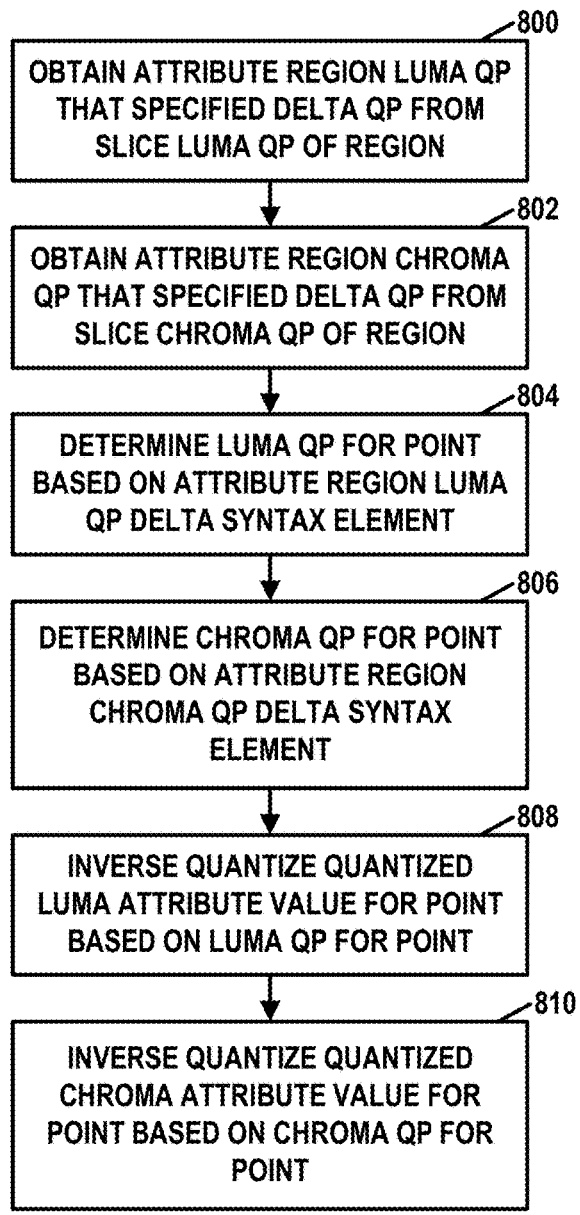
FIG. 8 is a flowchart illustrating an example operation for decoding point cloud data, in accordance with one or more techniques of this disclosure.

FIG. 8 is a flowchart illustrating an example operation for decoding point cloud data, in accordance with one or more techniques of this disclosure. In the example of FIG. 8, G-PCC decoder 300 may obtain, from a bitstream, an attribute region luma QP delta syntax element (e.g., ash_attr_region_luma_qp_delta) that specifies a delta QP from a slice luma QP of a region (800). Additionally, G-PCC decoder 300 may obtain, from the bitstream, an attribute region chroma QP delta syntax element (e.g., ash_attr_region_chroma_qp_delta) that specifies a delta QP from a slice chroma QP of the region (802).

Inverse quantization unit 308 may determine a luma QP for a point of the point cloud based on the attribute region luma QP delta syntax element (804). To determine the luma QP for the point based on the attribute region luma QP delta syntax element, inverse quantization unit 308 may determine whether the point is in a region box for the region. The region box for the region is a 3-dimensional boundary box (e.g., cuboid) that defines an edge of the region. If the point is within the region box for the region, inverse quantization unit 308 may determine the luma QP for the point as the slice luma QP plus a value (e.g., regionboxLumaDeltaQp) specified by the attribute region luma QP delta syntax element. If the point is not in the region box for the region, inverse quantization unit 308 may determine the luma QP for the point as being equal to the slice luma QP. In other words, inverse quantization unit 308 may determine qpY=layerQpY+(isPointContainedRegionBox? regionboxLumaDeltaQp: 0).

Additionally, inverse quantization unit 308 may determine a chroma QP for the point based on the attribute region chroma QP delta syntax element (806). To determine the chroma QP for the point based on the attribute region chroma QP delta syntax element, inverse quantization unit 308 may determine whether the point is in a region box for the region. If the point is within the region box for the region, inverse quantization unit 308 may determine the chroma QP for the point as the slice chroma QP plus a value (e.g., regionboxChromaDeltaQp) specified by the attribute region chroma QP delta syntax element. If the point is not in the region, inverse quantization unit 308 may determine the chroma QP for the point as being equal to the slice chroma QP. In other words, inverse quantization unit 308 may determine qpC=layerQpC+(isPointContainedRegionBox? regionboxChromaDeltaQp: 0).

Inverse quantization unit 308 may inverse quantize a quantized luma attribute value for the point based on the luma QP for the point (808). In some examples, to inverse quantize the quantized luma attribute value for the point, inverse quantization unit 308 may determine a luma QP step size for the point based on the luma QP value for the point. Inverse quantization unit 308 may determine the luma QP step size for the point by looking up the luma QP step size for the point in an array (QpToQstep) that maps QP values to QP step sizes. For instance, inverse quantization unit 308 may determine QstepY=QpToQstep(qpY). In this example, inverse quantization unit 308 may inverse quantize the luma attribute value by multiplying the quantized luma attribute value by the luma QP step size for the point. For instance, inverse quantization unit 308 may determine unquantAttributeCoefficients [i][a]=quantAttributeCoefficients[i][a]× (a==0 ? QstepY:QstepC).

Inverse quantization unit 308 may also inverse quantize a quantized chroma attribute value for the point based on the chroma QP for the point (810). In some examples, to inverse quantize the quantized chroma attribute value for the point, inverse quantization unit 308 may determine a chroma QP step size for the point based on the chroma QP value for the point. Inverse quantization unit 308 may determine the chroma QP step size for the point by looking up the chroma QP step size for the point in an array (QpToQstep) that maps QP values to QP step sizes. For instance, inverse quantization unit 308 may determine QstepC=QpToQstep(qpC). In this example, inverse quantization unit 308 may inverse quantize the chroma attribute value by multiplying the quantized chroma attribute value by the chroma QP step size for the point. For instance, inverse quantization unit 308 may determine unquantAttributeCoefficients [i][a]=quantAttributeCoefficients[i][a]×(a==0 ? QstepY:QstepC).

Examples of this disclosure may be used individually or in any combination.

The following is a non-limiting list of aspects that are in accordance with one or more techniques of this disclosure.

Aspect 1A. A method of decoding a point cloud, the method comprising: reconstructing a position of a point of the point cloud; and inverse quantizing attribute data for the point, wherein the attribute data for the point includes a luma value and a chroma value, and inverse quantizing the attribute data comprises: clipping a luma quantization parameter (QP) value; clipping a chroma QP value; inverse quantizing the luma value based on the clipped luma QP value; and inverse quantizing the chroma value based on the clipped chroma QP value.

Aspect 1B. A method of decoding a point cloud, the method comprising: reconstructing a position of a point of the point cloud; determining a quantized attribute value for the point; deriving a quantization parameter (QP) bit depth offset for the point; deriving a QP range for the point based on the QP bit depth offset for the point; determining a quantization step size for the point based on the QP range for the point; and inverse quantizing the quantized attribute value for the point based on the quantization step size for the point.

Aspect 2B. The method of aspect 1B, wherein: the quantized attribute value is a quantized luma attribute value for the point, and the method further comprises: determining a quantized chroma attribute value for the point; deriving a chroma QP bit depth offset for the point; deriving a chroma QP range for the point based on the chroma QP bit depth offset for the point; determining a chroma quantization step size for the point based on the chroma QP range for the point; and inverse quantizing the quantized chroma attribute value for the point based on the chroma quantization step size for the point.

Aspect 3B. The method of any of aspects 1B-2B, wherein determining the QP range for the point comprises deriving the QP range for the point as 0 to a value plus the QP bit depth offset for the point.

Aspect 4B. The method of any of aspects 1B-2B, wherein determining the QP range for the point comprises deriving the QP range for the point as a negative of the QP bit depth offset for the point to a maximum value.

Aspect 5B. The method of any of aspects 1B-4B, wherein determining the QP range for the point comprises: deriving a lower limit of the QP range for the point based on the QP bit depth offset for the point; and deriving an upper limit of the QP range for the point based on the QP bit depth offset for the point.

Aspect 6B. The method of any of aspects 1B-5B, wherein determining the quantization step size for the point comprises clipping a QP to the QP range for the point.

Aspect 1C. A method of decoding a point cloud, the method comprising: obtaining, from a bitstream, an attribute region luma quantization parameter (QP) delta syntax element that specifies a delta QP from a slice luma QP of a region; obtaining, from the bitstream, an attribute region chroma QP delta syntax element that specifies a delta QP from a slice chroma QP of the region; determining a luma QP for a point of the point cloud based on the attribute region luma QP delta syntax element; determining a chroma QP for the point based on the attribute region chroma QP delta syntax element; inverse quantizing a quantized luma attribute value for the point based on the luma QP for the point; and inverse quantizing a quantized chroma attribute value for the point based on the chroma QP for the point.

Aspect 2C. A method of encoding a point cloud, the method comprising: quantizing a luma attribute value for a point in the point cloud based on a luma quantization parameter (QP) for the point; quantizing a chroma attribute value for the point based on a chroma QP for the point; signaling, in a bitstream, data representing the quantized luma attribute value for the point and the quantized chroma attribute value for the point; signaling, in the bitstream, an attribute region luma QP delta syntax element that specifies a delta QP from a slice luma QP of a region; and signaling, in the bitstream, an attribute region chroma QP delta syntax element that specifies a delta QP from a slice chroma QP of the region.

Aspect 1D. A device for coding a point cloud, the device comprising one or more means for performing the method of any of aspects 1A-2C.

Aspect 2D. The device of aspect 1D, wherein the one or more means comprise one or more processors implemented in circuitry.

Aspect 3D. The device of any of aspects 1D or 2D, further comprising a memory to store data representing the point cloud.

Aspect 4D. The device of any of aspects 1D-3D, wherein the device comprises a decoder.

Aspect 5D. The device of any of aspects 1D-3D, wherein the device comprises an encoder.

Aspect 6D. The device of any of aspects 1D-4D, further comprising a device to generate the point cloud.

Aspect 7D. The device of any of aspects 1D-5D, further comprising a display to present imagery based on the point cloud.

Aspect 8D. A computer-readable storage medium having stored thereon instructions that, when executed, cause one or more processors to perform the method of any of aspects 1A-2C.

Aspect 1E: A method of decoding a point cloud includes reconstructing a position of a point of the point cloud; determining a quantized attribute value for the point; deriving a quantization parameter (QP) bit depth offset for the point; deriving a QP range for the point based on the QP bit depth offset for the point; determining a quantization step size for the point based on the QP range for the point; and inverse quantizing the quantized attribute value for the point based on the quantization step size for the point.

Aspect 2E: The method of aspect 1E, wherein: the quantized attribute value is a quantized luma attribute value for the point, and the method further comprises: determining a quantized chroma attribute value for the point; deriving a chroma QP bit depth offset for the point; deriving a chroma QP range for the point based on the chroma QP bit depth offset for the point; determining a chroma quantization step size for the point based on the chroma QP range for the point; and inverse quantizing the quantized chroma attribute value for the point based on the chroma quantization step size for the point.

Aspect 3E: The method of aspects 1E or 2E, wherein determining the QP range for the point comprises deriving the QP range for the point as 0 to a value plus the QP bit depth offset for the point.

Aspect 4E: The method of any of aspects 1E-3E, wherein determining the quantization step size for the point comprises clipping a QP to the QP range for the point.

Aspect 5E: The method of any of aspects 1E-4E, further comprising at least one of: determining a location of a physical object based on the point, or presenting imagery based on the attribute value of the point.

Aspect 7E: A device for decoding a point cloud includes a memory configured to store data representing the point cloud; and one or more processors implemented in circuitry, the one or more processors configured to: reconstruct a position of a point of the point cloud; determine a quantized attribute value for the point; derive a quantization parameter (QP) bit depth offset for the point; derive a QP range for the point based on the QP bit depth offset for the point; determine a quantization step size for the point based on the QP range for the point; and inverse quantize the quantized attribute value for the point based on the quantization step size for the point.

Aspect 8E: The device of aspect 7E, wherein: the quantized attribute value is a quantized luma attribute value for the point, and the one or more processors are further configured to: determine a quantized chroma attribute value for the point; derive a chroma QP bit depth offset for the point; derive a chroma QP range for the point based on the chroma QP bit depth offset for the point; determine a chroma quantization step size for the point based on the chroma QP range for the point; and inverse quantize the quantized chroma attribute value for the point based on the chroma quantization step size for the point.

Aspect 9E: The device of aspects 7E or 8E, wherein the one or more processors are configured such that, as part of determining the QP range for the point, the one or more processors derive the QP range for the point as 0 to a value plus the QP bit depth offset for the point.

Aspect 10E: The device of any of aspects 7E-9E, wherein the one or more processors are configured such that, as part of determining the quantization step size for the point, the one or more processors clip a QP to the QP range for the point.

Aspect 11E: The device of any of aspects 7E-10E, wherein the one or more processors are further configured to perform at least one of: determine a location of a physical object based on the point, or present imagery based on the attribute value of the point.

Aspect 12E: The device of any of aspects 7E-11E, further comprising a display to present imagery based on the point cloud.

Aspect 13E: The device of any of aspects 7E-12E, wherein the one or more processors are configured such that, as part of deriving the QP bit depth offset for the point, the one or more processors derive the QP bit depth offset for the point based on a bit depth of an attribute dimension.

Aspect 14E: A device for decoding a point cloud includes means for reconstructing a position of a point of the point cloud; means for determining a quantized attribute value for the point; means for deriving a quantization parameter (QP) bit depth offset for the point; means for deriving a QP range for the point based on the QP bit depth offset for the point; means for determining a quantization step size for the point based on the QP range for the point; and means for inverse quantizing the quantized attribute value for the point based on the quantization step size for the point.

Aspect 15E: The device of aspect 14E, wherein: the quantized attribute value is a quantized luma attribute value for the point, and the device further comprises: means for determining a quantized chroma attribute value for the point; means for deriving a chroma QP bit depth offset for the point; means for deriving a chroma QP range for the point based on the chroma QP bit depth offset for the point; means for determining a chroma quantization step size for the point based on the chroma QP range for the point; and means for inverse quantizing the quantized chroma attribute value for the point based on the chroma quantization step size for the point.

Aspect 16E: The device of aspects 14E or 15E, wherein the means for determining the QP range for the point comprises means for deriving the QP range for the point as 0 to a value plus the QP bit depth offset for the point.

Aspect 17E: The device of any of aspects 14E-16E, wherein the means for determining the quantization step size for the point comprises means for clipping a QP to the QP range for the point.

Aspect 18E: The device of any of aspects 14E-17E, wherein deriving the QP bit depth offset for the point comprises deriving the QP bit depth offset for the point based on a bit depth of an attribute dimension.

Aspect 19E: A computer-readable storage medium having stored thereon instructions that, when executed, cause one or more processors to: reconstruct a position of a point of a point cloud; determine a quantized attribute value for the point; derive a quantization parameter (QP) bit depth offset for the point; derive a QP range for the point based on the QP bit depth offset for the point; determine a quantization step size for the point based on the QP range for the point; and inverse quantize the quantized attribute value for the point based on the quantization step size for the point.

Aspect 20E: The computer-readable storage medium of aspect 19E, wherein: the quantized attribute value is a quantized luma attribute value for the point, and the instructions further cause the one or more processors to: determine a quantized chroma attribute value for the point; derive a chroma QP bit depth offset for the point; derive a chroma QP range for the point based on the chroma QP bit depth offset for the point; determine a chroma quantization step size for the point based on the chroma QP range for the point; and inverse quantize the quantized chroma attribute value for the point based on the chroma quantization step size for the point.

Aspect 21E: The computer-readable storage medium of aspects 19E or 20E, wherein the instructions that cause the one or more processors to determine the QP range for the point comprises instructions that, when executed, cause the one or more processors to derive the QP range for the point as 0 to a value plus the QP bit depth offset for the point.

Aspect 22E: The computer-readable storage medium of any of aspects 19E-21E, wherein the instructions that cause the one or more processors to determine the quantization step size for the point comprises instructions that, when executed, cause the one or more processors to clip a QP to the QP range for the point.

Aspect 23E: The computer-readable storage medium of any of aspects 19E-22E, wherein execution of the instruction causes the one or more processors to derive the QP bit depth offset for the point based on a bit depth of an attribute dimension.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a point cloud, the method comprising:
    reconstructing a position of a point of the point cloud;
    determining a quantized primary attribute value for a primary attribute of the point, wherein the primary attribute of the point provides reflectance information regarding the point;
    deriving a primary quantization parameter (QP) bit depth offset for the point based on a bit depth of the primary attribute;
    deriving a primary QP range for the point as a lower value to a value plus the primary QP bit depth offset for the point;
    determining a primary quantization step size for the point based on the primary QP range for the point;
    inverse quantizing the quantized primary attribute value for the point based on the primary quantization step size for the point;
    determining a quantized secondary attribute value for a secondary attribute of the point;
    deriving a secondary QP bit depth offset for the point;
    deriving a secondary QP range for the point based on the secondary QP bit depth offset for the point;
    determining a secondary quantization step size for the point based on the secondary QP range for the point; and
    inverse quantizing the quantized secondary attribute value for the point based on the secondary quantization step size for the point.

2. The method of claim 1, wherein determining the primary quantization step size for the point comprises clipping a QP to the primary QP range for the point.

3. The method of claim 1, further comprising at least one of:
    determining a location of a physical object based on the point, or
    presenting imagery based on the attribute value of the point.

4. The method of claim 1, wherein the secondary attribute of the point provides one of Red, Green, or Blue information regarding the point.

5. The method of claim 1, wherein the secondary attribute of the point provides one of luma or chroma information regarding the point.

6. The method of claim 1, wherein the lower value is equal to 0.

7. A device for decoding a point cloud, the device comprising:
    a memory configured to store data representing the point cloud; and
    one or more processors implemented in circuitry, the one or more processors configured to:
        reconstruct a position of a point of the point cloud;
        determine a quantized primary attribute value for a primary attribute of the point wherein the primary attribute of the point provides reflectance information regarding the point;
        derive a primary quantization parameter (QP) bit depth offset for the point based on a bit depth of the primary attribute;
        derive a primary QP range for the point as a lower value to a value plus the primary QP bit depth offset for the point;
        determine a primary quantization step size for the point based on the primary QP range for the point;
        inverse quantize the quantized primary attribute value for the point based on the quantization step size for the point;
        determine a quantized secondary attribute value for a secondary attribute of the point;
        derive a secondary QP bit depth offset for the point;
        derive a secondary QP range for the point based on the secondary QP bit depth offset for the point;

determine a secondary quantization step size for the point based on the secondary QP range for the point; and inverse quantize the quantized secondary attribute value for the point based on the secondary quantization step size for the point.

8. The device of claim 7, wherein the one or more processors are configured such that, as part of determining the primary quantization step size for the point, the one or more processors clip a QP to the primary QP range for the point.

9. The device of claim 7, wherein the one or more processors are further configured to perform at least one of:
determine a location of a physical object based on the point, or
present imagery based on the attribute value of the point.

10. The device of claim 7, further comprising a display to present imagery based on the point cloud.

11. A device for decoding a point cloud, the device comprising:
means for reconstructing a position of a point of the point cloud;
means for determining a quantized primary attribute value for a primary attribute of the point, wherein the primary attribute of the point provides reflectance information regarding the point;
means for deriving a primary quantization parameter (QP) bit depth offset for the point based on a bit depth of the primary attribute;
means for deriving a primary QP range for the point as a lower value to a value plus the primary QP bit depth offset for the point;
means for determining a primary quantization step size for the point based on the primary QP range for the point;
means for inverse quantizing the quantized primary attribute value for the point based on the quantization step size for the point;
means for determining a quantized secondary attribute value for a secondary attribute of the point;
means for deriving a secondary QP bit depth offset for the point;
means for deriving a secondary QP range for the point based on the secondary QP bit depth offset for the point;
means for determining a secondary quantization step size for the point based on the secondary QP range for the point; and
means for inverse quantizing the quantized secondary attribute value for the point based on the secondary quantization step size for the point.

12. The device of claim 11, wherein the means for determining the primary quantization step size for the point comprises means for clipping a QP to the primary QP range for the point.

13. The device of claim 11, wherein the secondary attribute of the point provides one of Red, Green, or Blue information regarding the point.

14. The device of claim 11, wherein the secondary attribute of the point provides one of luma or chroma information regarding the point.

15. The device of claim 11, wherein the lower value is equal to 0.

16. A non-transitory computer-readable storage medium having stored thereon instructions that, when executed, cause one or more processors to:
reconstruct a position of a point of a point cloud;
determine a quantized primary attribute value for a primary attribute of the point, wherein the primary attribute of the point provides reflectance information regarding the point;
derive a primary quantization parameter (QP) bit depth offset for the point based on a bit depth of the primary attribute;
derive a primary QP range for the point as a lower value to a value plus the primary QP bit depth offset for the point;
determine a primary quantization step size for the point based on the primary QP range for the point; and
inverse quantize the quantized primary attribute value for the point based on the primary quantization step size for the point;
determine a quantized secondary attribute value for a secondary attribute of the point;
derive a secondary QP bit depth offset for the point;
deriving a secondary QP range for the point based on the secondary QP bit depth offset for the point;
determine a secondary quantization step size for the point based on the secondary QP range for the point; and
inverse quantize the quantized secondary attribute value for the point based on the secondary quantization step size for the point.

17. The non-transitory computer-readable storage medium of claim 16, wherein the instructions that cause the one or more processors to determine the primary quantization step size for the point comprises instructions that, when executed, cause the one or more processors to clip a QP to the primary QP range for the point.

* * * * *